United States Patent
Lee et al.

(10) Patent No.: US 10,254,902 B2
(45) Date of Patent: *Apr. 9, 2019

(54) TOUCH SENSOR DEVICE INCLUDING A POLYMER LAYER HAVING CONDUCTIVE AND NON-CONDUCTIVE REGIONS

(71) Applicant: Samsung Display Co., Ltd., Yongin-si (KR)

(72) Inventors: Byeong-Jin Lee, Suwon-si (KR); Sung Ku Kang, Suwon-si (KR); Jung-Yun Kim, Cheonan-si (KR); Joo-Han Bae, Seongnam-si (KR); Dong Eun Lee, Asan-si (KR); In Nam Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 454 days.

This patent is subject to a terminal disclaimer.

(21) Appl. No.: 14/844,394

(22) Filed: Sep. 3, 2015

(65) Prior Publication Data
US 2016/0216827 A1    Jul. 28, 2016

(30) Foreign Application Priority Data
Jan. 28, 2015 (KR) ........................ 10-2015-0013776

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| 5,620,800 A | * | 4/1997 | De Leeuw | ........... | C08G 61/126 |
| | | | | | 156/150 |
| 8,717,330 B2 | | 5/2014 | Lu et al. | | |
| 9,024,910 B2 | * | 5/2015 | Stephanou | ............ | G06F 3/0414 |
| | | | | | 345/173 |
| 9,046,975 B2 | | 6/2015 | Kang et al. | | |

(Continued)

FOREIGN PATENT DOCUMENTS

| KR | 10-2012-0045380 | 5/2012 |
| KR | 10-1140878 | 5/2012 |

(Continued)

OTHER PUBLICATIONS

Table of Electrical Insulating Materials Properties. Kay & Laby, Tables of Physical & Chemical Constants. National Physical Laboratory. http://www.kayelaby.npl.co.uk/general physics/2_6/2_6_3.html. (Year: 2017).*

Primary Examiner — Kent W Chang
Assistant Examiner — Nathaniel P Brittingham
(74) Attorney, Agent, or Firm — H.C. Park & Associates, PLC

(57) ABSTRACT

A touch sensor device includes first touch electrodes and second touch electrodes disposed on a substrate, and a polymer layer including a polymer material disposed on the first and second touch electrodes and on a substantially entire area of the substrate, in which the polymer layer includes conductive and non-conductive regions.

23 Claims, 29 Drawing Sheets

(56) References Cited

U.S. PATENT DOCUMENTS

| | | | |
|---|---|---|---|
| 2005/0076824 A1* | 4/2005 | Cross | G06F 3/045 116/205 |
| 2006/0097991 A1* | 5/2006 | Hotelling | G06F 3/0416 345/173 |
| 2008/0237863 A1* | 10/2008 | Toyoda | H01L 21/76834 257/751 |
| 2010/0263246 A1* | 10/2010 | Oh | H05K 3/02 40/541 |
| 2011/0067933 A1* | 3/2011 | Chang | G06F 3/044 178/18.05 |
| 2011/0262631 A1 | 10/2011 | Lee et al. | |
| 2012/0044160 A1* | 2/2012 | Lan | G06F 3/044 345/173 |
| 2012/0105342 A1 | 5/2012 | Yu | |
| 2012/0241408 A1* | 9/2012 | Misaki | G02F 1/1333 216/20 |
| 2013/0106780 A1* | 5/2013 | Hotelling | G06F 3/0416 345/174 |
| 2013/0155011 A1* | 6/2013 | Kim | G06F 3/044 345/174 |
| 2014/0290988 A1* | 10/2014 | Spath | H05K 1/09 174/254 |
| 2014/0299365 A1* | 10/2014 | Sebastian | G06F 3/044 174/255 |
| 2015/0130760 A1* | 5/2015 | Kim | G06F 3/044 345/174 |
| 2015/0287748 A1* | 10/2015 | Jin | H01L 27/124 257/306 |
| 2015/0287751 A1* | 10/2015 | Jin | H01L 27/124 438/23 |
| 2015/0313015 A1* | 10/2015 | Wada | H01L 23/49811 174/261 |
| 2015/0363024 A1* | 12/2015 | Hayashi | G06F 3/044 345/174 |
| 2015/0370375 A1* | 12/2015 | Hayashi | G06F 3/044 345/174 |
| 2016/0026310 A1* | 1/2016 | Wang | G06F 3/0412 345/173 |
| 2016/0048251 A1* | 2/2016 | Chang | G06F 3/0412 345/174 |
| 2016/0109977 A1* | 4/2016 | Hashimoto | G06F 3/044 345/174 |
| 2016/0128183 A1* | 5/2016 | Matsumoto | H05K 1/0224 174/250 |
| 2016/0162086 A1* | 6/2016 | Yang | C23C 14/24 345/174 |
| 2016/0195987 A1* | 7/2016 | Lin | G06F 3/0412 345/173 |
| 2016/0204366 A1* | 7/2016 | Zhang | H01L 23/4985 257/40 |
| 2016/0224170 A1* | 8/2016 | Kim | G06F 3/044 |
| 2016/0252997 A1* | 9/2016 | Yao | G06F 3/044 345/174 |
| 2016/0320872 A1* | 11/2016 | Lee | G06F 3/044 |
| 2016/0342056 A1* | 11/2016 | Long | G02F 1/133345 |
| 2017/0184897 A1* | 6/2017 | Rho | G02F 1/133345 |
| 2017/0192544 A9* | 7/2017 | Huang | G06F 3/041 |

FOREIGN PATENT DOCUMENTS

| | | |
|---|---|---|
| KR | 10-2013-0126007 | 11/2013 |
| KR | 10-2013-0126097 | 11/2013 |
| KR | 10-2014-0028890 | 3/2014 |
| KR | 10-2014-0035049 | 3/2014 |
| KR | 10-1377423 | 3/2014 |
| KR | 10-2014-0039795 | 4/2014 |
| KR | 20-0472035 | 4/2014 |

* cited by examiner

TOUCH SENSOR DEVICE INCLUDING A POLYMER LAYER HAVING CONDUCTIVE AND NON-CONDUCTIVE REGIONS

CROSS-REFERENCE TO RELATED APPLICATION

This application claims priority from and the benefit of Korean Patent Application No. 10-2015-0013776, filed on Jan. 28, 2015, which is hereby incorporated by reference for all purposes as if fully set forth herein.

BACKGROUND

Field

Exemplary embodiments of the present invention relate to a touch sensor device including a polymer layer and a manufacturing method thereof.

Discussion of the Background

Electronic devices such as a liquid crystal display (LCD), an organic light emitting diode (OLED) display, and an electrophoretic display may include a touch sensing function through which a user may interact with the electronic devices. The touch sensing function may be used to obtain touch information such as whether an object approaches or contacts a touch screen and a touch position, by sensing a change in pressure, charge, light, etc., that is applied onto a screen of a display device, when a user writes text or draws a figure by approaching or touching the screen using a finger or a touch pen. Touch sensing functions may be implemented by a touch sensor.

The touch sensor may be classified into various types, such as a resistive type, a capacitive type, an electromagnetic (EM) type, an optical type, etc. In the resistive type touch sensor, two electrodes separated and facing each other may contact each other by a pressure applied from an external object. When the two electrodes contact each other, the touch position may be determined by detecting a voltage change due to a change in resistance at the touch position.

The capacitive type touch sensor may include a sensing capacitor including sensing electrodes for transmitting a detection signal, and determine a touch and a touch position by detecting a change in capacitance of the sensing capacitor or amount of charges when a conductor such as a finger approaches the touch sensor. The capacitance type touch sensor may include touch electrodes for sensing the touch, which are located in a touch sensing area to sense a touch, and signal-transmitting wires connected to the touch electrodes. The signal-transmitting wires may transmit a sensing input signal to the touch electrodes, or may transmit a sensing output signal of the touch electrodes generated by the touch to a sensing signal controller. The signal-transmitting wires may be located in a peripheral area around a touch sensing area of a touch sensing panel or in the touch sensing area.

When a glass substrate is used in electronic devices, such as display devices and the like, portability and size of a display screen may be limited due to weight and the fragile property of the glass substrate. Accordingly, a flexible display device using a plastic substrate, which may be light, resistant to impacts, and flexible has been studied. In the flexible display device, the touch sensor attached to or integrated into the device may need to be flexible.

Flexible touch sensors may include a transformable part that is foldable, bendable, rollable, stretchable in at least one direction, or elastic. The flexible touch sensor includes touch electrodes, and the touch electrodes may have flexibility to prevent generation of defects after being transformed. As a material for the flexible touch electrodes, a metal nanowire such as a silver nanowire (AgNW), carbon nanotubes, graphene, a metal mesh, and a conductive polymer has been studied.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch sensor device with improved flexibility, such as bendability.

The exemplary embodiments of the present invention also provide a simplified manufacturing process of a flexible touch sensor.

The exemplary embodiments of the present invention further provide a method of reducing damage to a flexible touch sensor from static electricity and improving optical characteristic of a touch sensor including a conductive polymer.

According to an exemplary embodiment of the present invention, a touch sensor device includes first touch electrodes and second touch electrodes disposed on a substrate, and a polymer layer including a polymer material disposed on the first and second touch electrodes and on a substantially entire area of the substrate, in which the polymer layer includes conductive and non-conductive regions.

The conductive region of the polymer layer may include a first connecting portion connecting adjacent first touch electrodes.

The touch sensor device may further include a second connecting portion connecting adjacent second touch electrodes, in which the first and second connecting portions may be insulated from and cross each other.

The touch sensor device may further include a first insulator disposed between the first connecting portion and the second connecting portion.

The first insulator may include a recess portion extending from a first end to a second end of the first insulator, and a portion of the first connecting portion may be disposed on the recess portion.

The first touch electrodes may include a first conductive layer, the conductive region of the polymer layer may include the first conductive layer connected to the first connecting portion, and the second touch electrodes may include a second conductive layer insulated from the first connecting portion.

The first conductive layer and the second conductive layer may have a mesh shape.

The first touch electrodes may further include at least one conductive layer disposed between the first conductive layer and the substrate, and the second touch electrodes may further include at least one conductive layer disposed between the second conductive layer and the substrate.

The touch sensor device may further include a first touch wire connected to the first touch electrodes and a second touch wire connected to the second touch electrodes, in which a pad portion of the first and second touch wires may include conductive layers, and the conductive region of the polymer layer may include one of the conductive layers of the pad portion.

The touch sensor device may further include a second insulator covering the first and second touch wires except for the pad portion.

The touch sensor device may further include an insulating layer disposed between the first connecting portion and the second connecting portion and on a substantially entire surface of the substrate, in which the insulating layer may include first and second contact holes for respectively exposing adjacent first touch electrodes, and the first connecting portion may connect the adjacent first touch electrodes through the first and second contact holes.

The insulating layer may include at least one recess portion connecting the first contact hole and the second contact hole, and a portion of the first connecting portion may be disposed on the recess portion.

According to an exemplary embodiment of the present invention, a touch sensor device includes a touch wires and first connecting portions disposed on a substrate, and a polymer layer including a polymer material disposed on the touch wires and the first connecting portions and on a substantially entire area of the substrate, in which the polymer layer includes conductive and non-conductive regions.

The conductive region of the polymer layer may include first touch electrodes and second touch electrodes.

The touch sensor device may further include a second connecting portion connecting adjacent second touch electrodes, and a first insulator disposed between the first connecting portion and the second connecting portion.

A pad portion of the touch wire may include conductive layers, and the conductive region of the polymer layer may include one of the conductive layers of the pad portion.

According to an exemplary embodiment of the present invention, a manufacturing method of a touch sensor device includes forming first touch electrodes, second touch electrodes, and touch wires connected to the first and second touch electrodes on a substrate, forming a polymer layer by coating a polymer material on a substantially entire surface of the substrate, forming a mask pattern on the polymer layer, forming a non-conductive region by oxidizing the polymer layer exposed by the mask pattern, and forming a conductive region covered by the mask pattern.

The conductive region of the polymer layer may include a first connecting portion connecting adjacent first touch electrodes.

Forming the first and second touch electrodes may further include forming a second connecting portion connecting adjacent second touch electrodes, and forming a first insulator covering the second connecting portion after forming the first and second touch electrodes.

The first insulator may include a recess portion extending from one end to the other end of the first insulator.

Forming the first and second touch electrodes may further include forming a second connecting portion connecting adjacent second touch electrodes, forming an insulating layer on a substantially entire surface of the substrate after forming the first and second touch electrodes, the insulating layer includes first and second contact holes exposing the adjacent first touch electrodes, respectively, and the first connecting portion may connect the adjacent first touch electrodes through the first and second contact holes.

The conductive region of the polymer layer may include one of conductive layers of a pad portion of the touch wires.

According to an exemplary embodiment of the present invention, a manufacturing method of a touch sensor device includes forming touch wires and first connecting portions on a substrate, forming a polymer layer by coating a polymer material on a substantially entire surface of the substrate, forming a mask pattern on the polymer layer, forming a non-conductive region by oxidizing the polymer layer exposed by the mask pattern, and forming a conductive region covered by the mask pattern.

The conductive region of the polymer layer may include first touch electrodes, second touch electrodes, and a second connecting portion connecting adjacent second touch electrodes.

The manufacturing method may further include forming a first insulator covering the first connecting portion after forming the touch wires and the first connecting portions.

The conductive region of the polymer layer may include one of conductive layers of a pad portion of the touch wires.

According to the exemplary embodiments of the present invention, flexibility of the flexible touch sensor such as bendability may be improved and the manufacturing process of the flexible touch sensor may be simplified.

According to the exemplary embodiments of the present invention, damage to a flexible touch sensor due to the static electricity may be reduced.

According to the exemplary embodiments of the present invention, a touch sensor including the conductive polymer may have improved optical characteristics.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
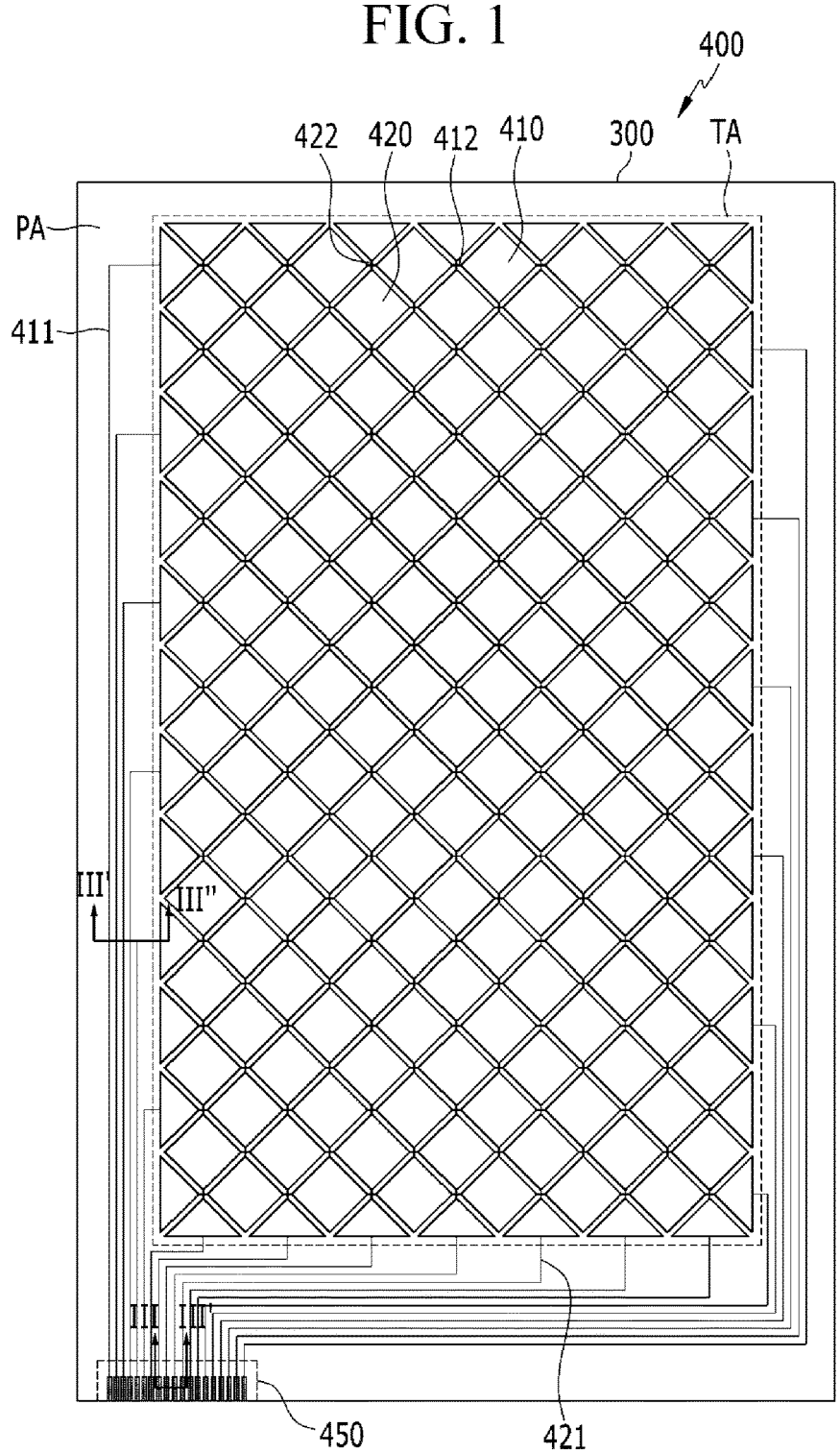
FIG. 1 is a top plan view of a touch sensor device including touch sensors according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, a touch sensor device 400 according to an exemplary embodiment of the present invention includes a touch sensing area TA for detecting a touch and a peripheral area PA surrounding the touch sensing area TA. Touch sensors are disposed in the touch sensing area TA. The touch sensor may sense a touch in various ways. For example, the touch sensor may be classified into various types such as a resistive type, a capacitive type, an electromagnetic (EM) type, an optical type, etc. In the present exemplary embodiment, a capacitance type of touch sensor will be described.

The touch sensor according to the present exemplary embodiment includes touch electrodes, and the touch electrodes may include first touch electrodes 410 and second touch electrodes 420. The first and second touch electrodes 410 and 420 are separated from each other. The first touch electrodes 410 and the second touch electrodes 420 may be alternately disposed, and not overlapping each other in the touch sensing area TA.

The first touch electrodes 410 may be disposed along column and row directions and the second touch electrodes 420 may be disposed along the column and row directions, respectively. The first and second touch electrodes 410 and 420 may be disposed on the same layer. The first and second touch electrodes 410 and 420 may respectively have a quadrangular shape. Alternatively, the first and second touch electrodes 410 and 420 may have various shapes such as a protrusion, to improve sensitivity of the touch sensor.

The first touch electrodes 410 arranged in the same row or column may be connected to or separated from each other inside or outside the touch sensing area TA. At least some of the second touch electrodes 420 arranged in the same column or row may be connected to or separated from each other inside or outside the touch sensing area TA.

Referring to FIG. 1, when the first touch electrodes 410 arranged in the same row are connected to each other inside the touch active area TA, the second touch electrodes 420 arranged in the same column may be connected to each other inside the touch active area TA. More particularly, the first touch electrodes 410 positioned in each row may be connected to each other through first connecting portions 412, and the second touch electrodes 420 positioned in each column may be connected to each other through second connecting portions 422.

The first touch electrodes 410 connected to each other in each row may be connected to a touch driver (not shown) through a first touch wire 411, and the second touch electrodes 420 connected to each other in each column may be connected to the touch driver (not shown) through a second touch wire 421. The first and second touch wires 411 and 421 may be disposed in the peripheral area PA. Alternatively, the first and second touch wires 411 and 421 may be disposed in the touch sensing area TA.

End portions of the first and second touch wires 411 and 421 form a pad portion 450 in the peripheral area PA. The pad portion 450 is connected to the touch driver (not shown).

The touch driver (not shown) may be directly mounted on the pad portion 450 as at least one integrated circuit (IC) chip, mounted on a flexible printed circuit film to be connected to the pad portion 450 as a tape carrier package (TCP), or mounted on a separate printed circuit board (PCB) to be connected to the pad portion 450. The touch driver may be connected to the first and second touch wires 411 and 421 through the pad portion 450.

The first and second touch electrodes 410 and 420 adjacent to each other form a mutual sensing capacitor that may serve as a touch sensor. The mutual sensing capacitor may receive a sensing input signal from one of the first and second touch electrodes 410 and 420, and may output a change in an amount of charges due to a contact of an external object, as a sensing output signal, through the other one of the first and second touch electrodes 410 and 420.

Alternatively, the first touch electrodes 410 and the second touch electrodes 420 may be separated from each other, such that the first and second touch electrodes 410 and 420 are connected to the touch driver (not shown) through the touch wires (not shown), respectively. In this case, each of the first and second touch electrodes 410 and 420 may form a self-sensing capacitor that may serve as the touch sensor. The self-sensing capacitor may be charged with predetermined charges by receiving a sensing input signal, and if contact due to the external object such as a finger occurs, the amount of charges thereof may be changed to output a sensing output signal that is different from the received sensing input signal.

Figure 2:
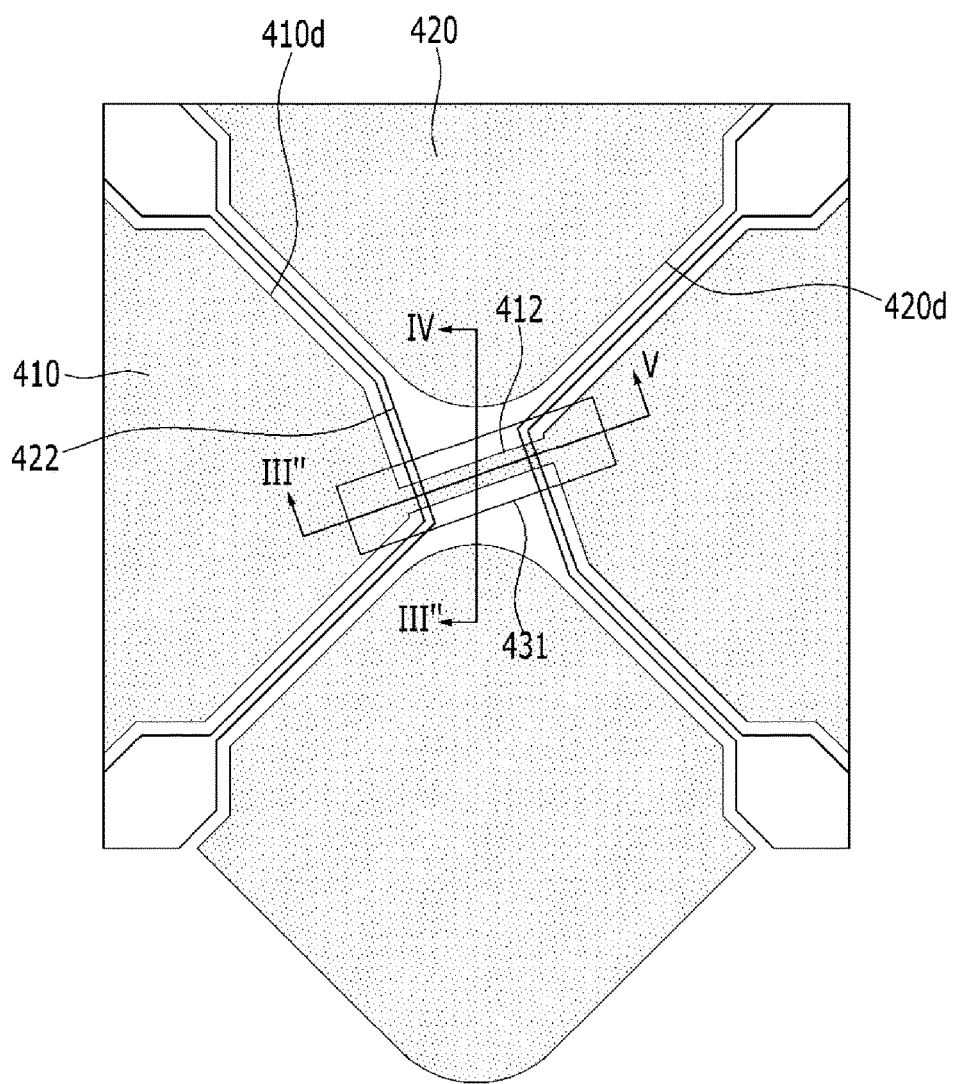
FIG. 2 is a partial enlarged view of the touch sensor device illustrated in FIG. 1.
Figure 3:
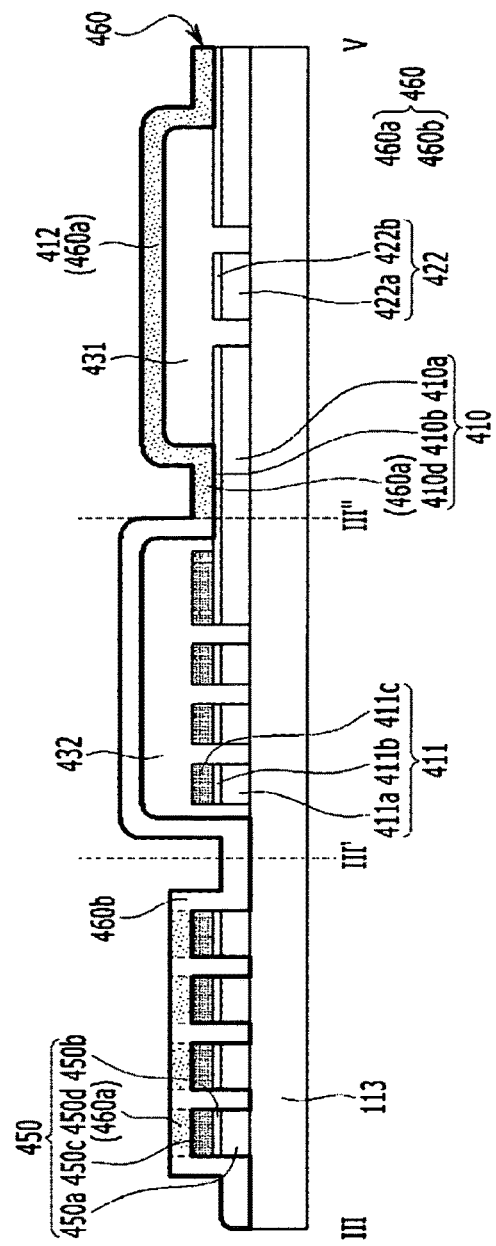
FIG. 3 is a cross-sectional view of the touch sensor device illustrated in FIGS. 1 and 2, taken along the line III-III'-III"-V.
Figure 4:
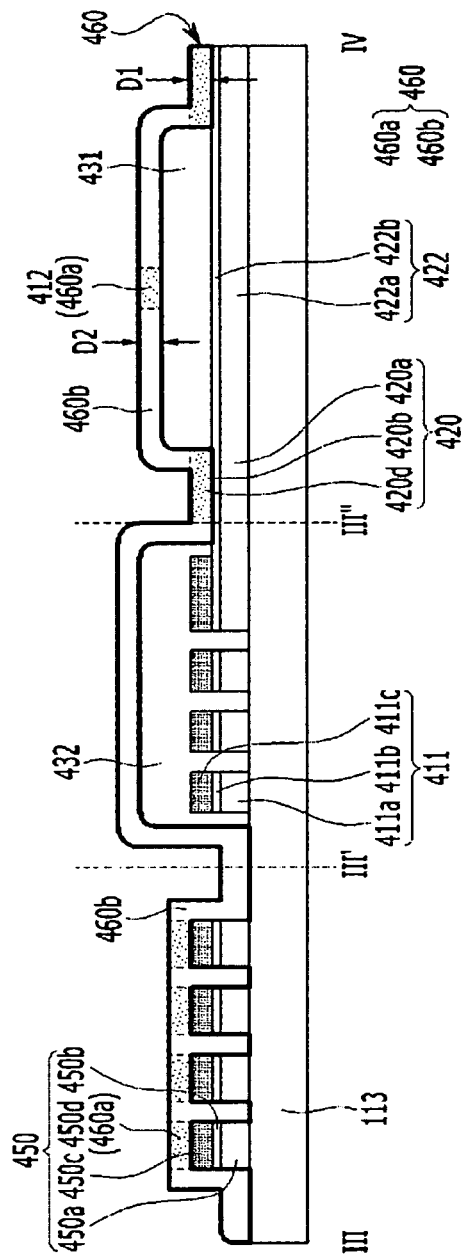
FIG. 4 is a cross-sectional view of the touch sensor device illustrated in FIGS. 1 and 2, taken along the line III-III'-III"-IV.

Referring to FIGS. 2 to 4, the first and second touch electrodes 410 and 420, the second connecting portions 422, and the first and second touch wires 411 and 421 may be disposed on a substrate 113. The substrate 113 may include glass or plastic, and may have flexibility. The first and second touch electrodes 410 and 420 may have a predetermined transmittance for transmitting light, and may include at least one conductive layer.

The first and second touch electrodes 410 and 420 may include first conductive layers 410a and 420a, and second conductive layers 410b and 420b disposed thereon. The first conductive layers 410a and 420a, which serve as main conductive layers, may include a transparent conductive material such as metal nanowires such as silver nanowires (AgNW), a metal mesh, carbon nanotubes (CNT), graphene, indium tin oxide (ITO), indium zinc oxide (IZO), gallium indium zinc oxide (GIZO), aluminum doped zinc oxide (ZAO), etc., and the second conductive layers 410b and 420b, as supplementary conductive layers, may include amorphous ITO, IZO, etc. Alternatively, the second conductive layers 410b and 420b may be omitted.

The second connecting portion 422 for interconnecting adjacent second touch electrodes 420 is disposed on the same layer as the second touch electrodes 420. The second connecting portion 422 and the second touch electrodes 420 may be integrally formed, and the second connecting portion 422 and the second touch electrodes 420 may be formed together through patterning.

The second connecting portion 422 may include a first conductive layer 422a that includes the same material as the first conductive layers 410a and 420a, and a second conductive layer 422b disposed on the first conductive layer 422a and including the same material as the second conductive layers 410b and 420b. The second conductive layer 422b may be omitted.

The first and second touch wires 411 and 421 may include a first conductive layer 411a, a second conductive layer 411b disposed thereon, and a third conductive layer 411c disposed thereon. The pad portion 450 may include a first conductive layer 450a, a second conductive layer 450b disposed thereon, and a third conductive layer 450c disposed thereon.

The first conductive layers 411a and 450a of the first and second touch wires 411 and 421 and the pad portion 450 may be disposed on the same layer as the first conductive layers 410a and 420a of the first and second touch electrodes 410 and 420, and may include the same material.

The second conductive layer 411b may be disposed on the same layer as the second conductive layers 410b and 420b included in the first and second touch electrodes 410 and 420, and may include the same material. When the second conductive layers 410b and 420b are omitted, the second conductive layers 411b of the first and second touch wires 411 and 421 may be omitted.

The third conductive layers 411c and 450c of the first and second touch wires 411 and 421 and the pad portion 450 may have lower resistances than the resistances of the first and second conductive layers 411a and 411b.

The third conductive layers 411c and 450c may include a low resistance material, such as a metal, including molybdenum (Mo), silver (Ag), titanium (Ti), copper (Cu), palladium, aluminum (Al), or molybdenum/aluminum/molybdenum (Mo/Al/Mo), or a metal alloy such as silver/palladium/copper (APC).

Referring to FIGS. 1 to 4, insulators 431 are disposed on the first and second touch electrodes 410 and 420 and an exposed portion of the substrate 113. An insulator 432 may be disposed on the first and second touch wires 411 and 421 and the exposed portion of the substrate 113. The insulator 431 is disposed between the first connecting portion 412 and the second connecting portion 422 to insulate the first connecting portion 412 and the second connecting portion 422.

The insulators 431 may be separate islands that are disposed at each intersection of the first connecting portion 412 and the second connecting portion 422. The insulator 431 may expose at least some of the second conductive layer 410b of the first touch electrode 410 such that the first connecting portion 412 is connected to the first touch electrode 410.

The insulator 432 may be disposed on the first and second touch wires 411 and 421 to protect the first and second touch wires 411 and 421, and prevent a short-circuit between the first and second touch wires 411 and 421 or with other wires. The insulator 432 may not cover the pad portion 450. Alternatively, the insulator 432 may cover a portion of the pad portion 450. The insulators 431 and 432 may include an organic or inorganic insulating material.

A polymer layer 460 may cover the first and second touch electrodes 410 and 420, the insulators 431 and 432, and the pad portion 450. The polymer layer 460 is seamlessly formed on the substrate 113, and is divided into a conductive region 460a and a non-conductive region 460b. Hereinafter, the conductive region 460a of the polymer 460 is shown darker than the non-conductive region 460b of the polymer layer 460, as shown in FIGS 3 and 4. More particularly, the conductive region 460a and the non-conductive region 460b are both disposed on the polymer layer 460. In FIGS. 3 and 4, various portions of the polymer layer 460 designated with different reference numerals are additionally labeled as the conductive region 460a or non-conductive region 460b in parentheses.

The polymer layer 460 includes a polymer material such as polyacetylene, polyaniline (PANI), polythiophene (PT), polypyrrole, polyphenylene vinylene (PPV), poly(3,4-ethylenedioxythiopene) (PEDOT), etc. Among the polymer materials, PEDOT may be obtained by polymerizing 3,4-ethylenedioxythiophene (EDOT) via chemical polymerization and the like, in which PEDOT may have high flexibility, heat resistance, and conductivity.

As PEDOT is not water-soluble in itself, a PEDOT-based conductive material may be dissolved in an organic solvent or dispersed in an aqueous solvent by using polystyrene sulfonate (PSS) as a water-soluble polymer, thereby obtaining aqueous-dispersible poly(3,4-ethylenedioxythiophene): polystyrene sulfonate (PEDOT:PSS). PEDOT:PSS may have high transparency and conductivity, and high heat resistance and safety. PEDOT:PSS may further include additives such as dimethyl-sulphoxide (DMSO), ethylene glycol (EG), etc., and may have different conductivities depending on the additives.

After laminating a polymer material such as PEDOT and the like, a portion of the polymer layer 460 to be formed as the conductive region is covered by a mask and an exposed portion of the polymer layer 460 may be deactivated to form the non-conductive region. An oxidation method using an oxidant, such as ceric ammonium nitrate (CAN), sodium hypochlorite (NaOClx), etc., may be used to deactivate the exposed portion of the polymer layer 460. An unoxidized part of the polymer layer 460 retains conductivity.

The conductive region of the polymer layer 460 may include a first connecting portion 412 for interconnecting the first touch electrodes 410 adjacent to each other, and a fourth conductive layer 450d disposed on the third conductive layer 450c of the pad portion 450. The first connecting portion 412 is physically and electrically connected to the two adjacent first touch electrodes 410 to electrically connect the adjacent first touch electrodes 410. The first connecting portion 412 is disposed on the insulator 431 to be insulated from the second connecting portion 422.

Referring to FIGS. 2 to 4, the conductive region of the polymer layer 460 may further include fourth conductive layers 410d and 420d disposed on the second conductive layers 410b and 420b of the first and second touch electrodes 410 and 420. The fourth conductive layers 420d included in the second touch electrodes 420 are arranged along the column direction, and may be separated from each other.

When the first and second touch electrodes 410 and 420 include the fourth conductive layers 410d and 420d, the first connecting portion 412 is directly connected to the fourth conductive layers 410d and 420d. However, when the first and second touch electrodes 410 and 420 do not include the fourth conductive layers 410d and 420d, the first connecting portion 412 may directly contact upper surfaces of the second conductive layers 410b and 420b to be connected thereto. The first and second touch electrodes 410 and 420 may have improved bendability and adhesion by the fourth conductive layers 410d and 420d.

The insulator 431 is disposed between the first connecting portion 412 and the second connecting portion 422 to insulate the first connecting portion 412 from the second connecting portion 422. As illustrated, the insulator 431 may be separate islands that are disposed at each intersection of the first connecting portion 412 and the second connecting portion 422. The insulator 431 may expose at least a portion of the first touch electrode 410 such that the first connecting portion 412 is connected to the first touch electrode 410. The insulator 431 may have round corners or a polygonal shape.

According to an exemplary embodiment of the present invention, the insulating layer (not shown) may be formed on the substantially entire area, and the insulating layer disposed on a portion of the first touch electrode 410 may be removed to connect the adjacent first touch electrodes 410 in the row direction, thereby forming a contact hole (not shown).

Referring to FIG. 4, a thickness D2 of the first connecting portion 412 disposed on the insulator 431 may be the same as or different from a thickness D1 of the polymer layer 460 disposed on the first touch electrode 410. As the polymer material for forming the polymer layer 460 has lower viscosity, the thickness D2 of the first connecting portion 412 may be smaller than the thickness D1 of the polymer layer 460 disposed on the first touch electrode 410.

As described above, according to the present exemplary embodiment, since the first and second touch electrodes 410 and 420, the first and second connecting portion 412 and 422, and the first and second touch wires 411 and 421 include the conductive layer formed of the conductive region of the polymer layer 460 thereon, the touch sensor device 400 may have improved flexibility and a high bending characteristic even with a smaller bending radius. Accordingly, even with the smaller bending radius, the flexible touch sensor device 400 may have high flexibility, such as foldable, bendable, rollable, stretchable in at least one direction, and elastic properties.

In addition, the fourth conductive layers 410d and 420d may increase electrical paths of the first and second touch electrodes 410 and 420, along with the first conductive layers 410a and 420a and/or the second conductive layers 410b and 420b, to reduce resistance, and may provide the electrical paths of the first conductive layers 410a and 420a and/or the second conductive layers 410b and 420b to compensate a fault due to a crack and the like, thereby preventing a touch sensing failure. More particularly, because the first conductive layers 410a and 420a and the second conductive layers 410b and 420b are disposed below the fourth conductive layers 410d and 420d, the first and second touch electrodes 410 and 420 may not appear bluish due to PEDOT, thereby improving an optical characteristic.

In addition, when the first connecting portion 412 including the polymer layer 460 is connected to the fourth conductive layers 410d and 420d, contact resistance may decrease and a resistance gap between the first touch electrode 410 and the first connecting portion 412 may decrease, such that generation of static electricity and damage to the first touch electrodes 410 and the first connecting portion 412 due to the static electricity may be prevented, as compared to when the first connecting portion 412 directly contacts the second conductive layers 410b and 420b.

In addition, since the polymer layer 460 is coated on the substantially entire surface of the substrate 113 and is not etched, corrosion or oxidation of the conductive layer and the like disposed in the uppermost part may be prevented, and the polymer layer 460 may serve as an insulating layer or overcoat. Accordingly, an insulating layer may not have to be additionally formed on the conductive layers such as the first and second touch electrodes 410 and 420, the first and second touch wires 411 and 421, and the pad portion 450, thus a manufacturing process of the touch sensor device 400 may be simplified.

According to an exemplary embodiment of the present invention, the first connecting portion 412 for interconnecting the adjacent first touch electrodes 410 may be disposed on the same layer as the first touch electrodes 410 to be integrally formed with the first touch electrodes 410, and the second connecting portion 422 for interconnecting the adjacent second touch electrodes 420 may be disposed on a different layer from the second touch electrodes 420 to be formed as the conductive region of the polymer layer 460. In this case, the second connecting portion 422 and a structure connected thereto may have the same characteristics of the first connecting portion 412 described above.

Hereinafter, a manufacturing method of a touch sensor device according to an exemplary embodiment of the present invention will be described with reference to FIGS. 5 to 10.

FIGS. 5, 6, 7, 8, 9, and 10 are cross-sectional views of a touch sensor according to an exemplary embodiment of the present invention, taken along the line III-III'-III''-V illustrated in FIGS. 1 and 2.

Figure 5:
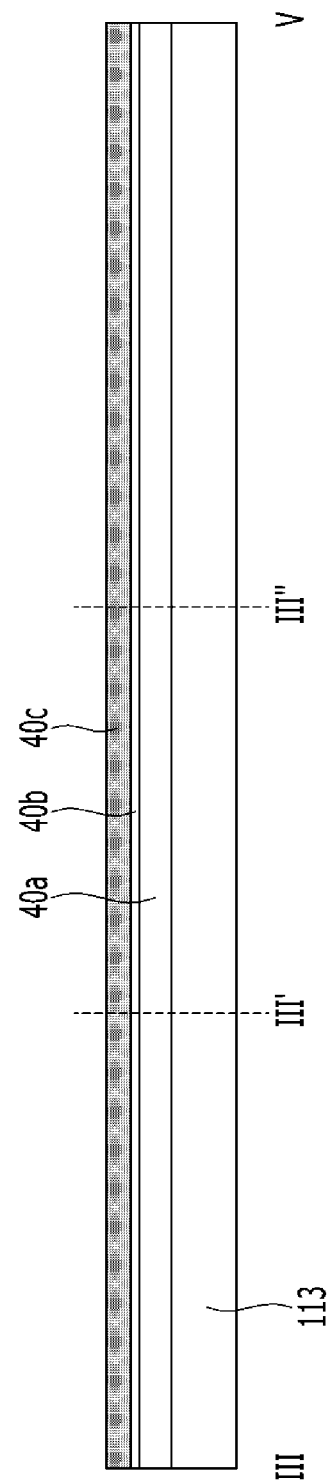
FIGS. 5, 6, 7, 8, 9, and 10 are cross-sectional views of an intermediate product manufactured by a manufacturing method of a touch sensor according to an exemplary embodiment of the present invention, taken along the line corresponding to the line III-III'-III"-V illustrated in FIGS. 1 and 2.

Referring to FIG. 5, a substrate 113 including glass or plastic is prepared, and a transparent conductive material of metal nanowires such as silver nanowires (AgNW), a metal mesh, carbon nanotubes (CNT), graphene, indium tin oxide (ITO), indium zinc oxide (IZO), gallium indium zinc oxide (GIZO), aluminum doped zinc oxide (ZAO), etc., is laminated on the substrate 113 to form a first conductive layer 40a.

Next, a conductive material, such as ITO, IZO, etc., is laminated on the first conductive layer 40a to form a second conductive layer 40b. A process of forming the second conductive layer 40b may be omitted.

Then, a low resistance material, such as a metal such as molybdenum (Mo), silver (Ag), titanium (Ti), copper (Cu), palladium, aluminum (Al), molybdenum/aluminum/molybdenum (Mo/Al/Mo), etc., or a metal alloy such as silver/palladium/copper (APC) is laminated on the second conductive layer 40b to form a third conductive layer 40c.

Figure 6:
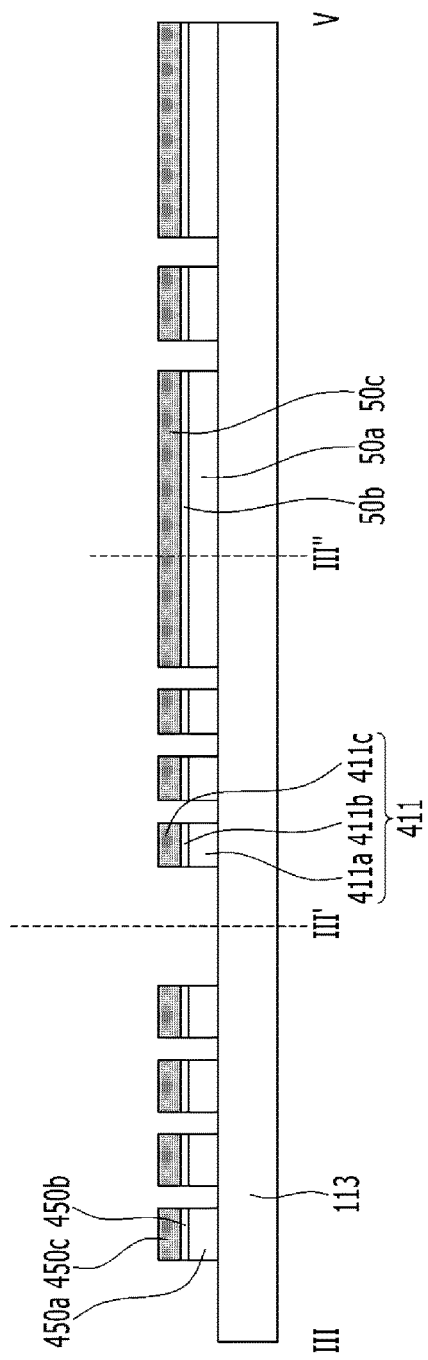

Referring to FIG. 6, the first conductive layer 40a, the second conductive layer 40b, and the third conductive layer 40c are patterned using a photolithography process to form first, second, and third conductive layers 450a, 450b, and 450c of a pad portion 450, first, second, and third conductive layers 411a, 411b, and 411c of first and second touch wires 411 and 421, and a conductive pattern including first, second, and third conductive layers 50a, 50b, and 50c and disposed in a touch sensing area TA. A shape of the conductive pattern may be substantially the same as those of the first and second touch electrodes 410 and 420 described above.

Figure 7:
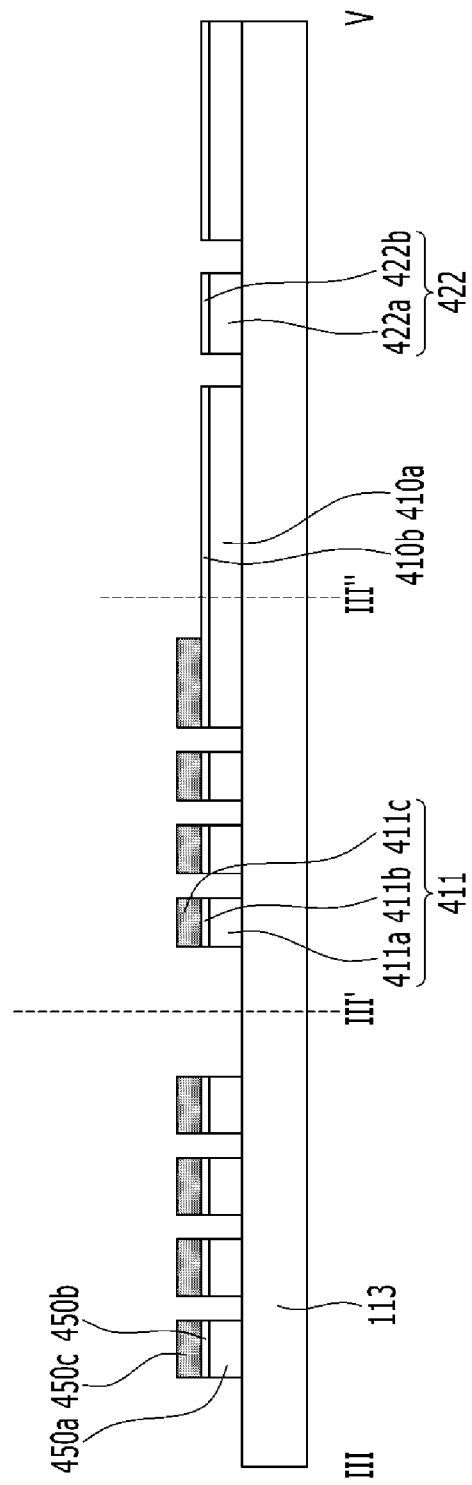

Referring to FIG. 7, the third conductive layer 50c, which is the uppermost layer of the conductive pattern disposed in the touch sensing area TA, is then removed using a method such as a photolithography process and the like, to form first touch electrodes 410, second touch electrodes 420, and second connecting portions 422, which are transparent. Alternatively, when the first touch electrodes 410 arranged in the same column are connected to the first connecting portion 412 disposed on the same layer, the first connecting portion 412 instead of the second connecting portion 422 may be formed in the current step.

Figure 8:
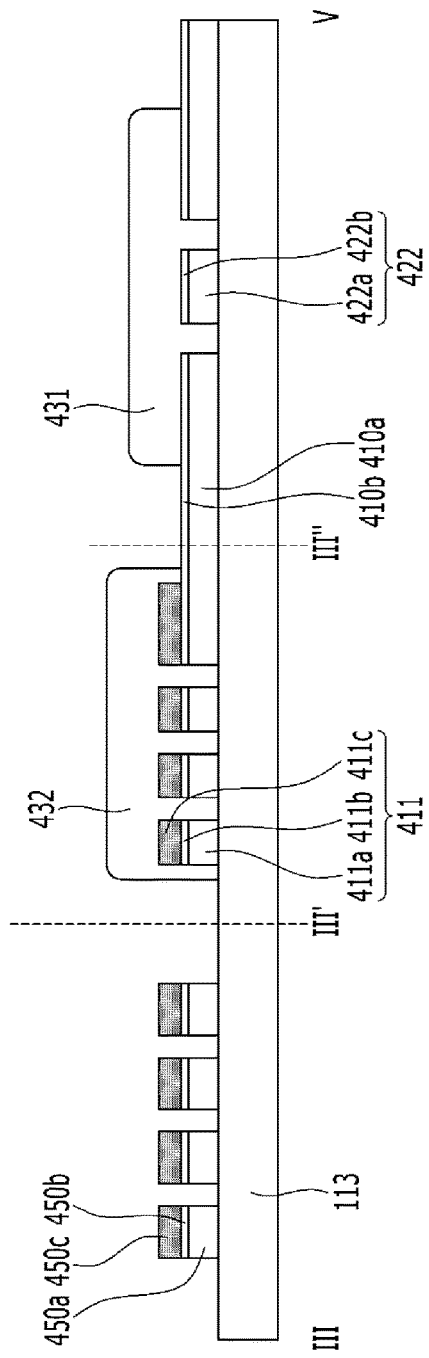

Referring to FIG. 8, an insulating material is laminated and patterned on the first touch electrode 410, the second touch electrode 420, the second connecting portion 422, and the first and second touch wires 411 and 421, such that an insulator 431 is formed on the second connecting portion 422 to cover the second connecting portion 422, and an insulator 432 is formed on the first and second touch wires 411 and 421 to cover the first and second touch wires 411 and 421.

Figure 9:
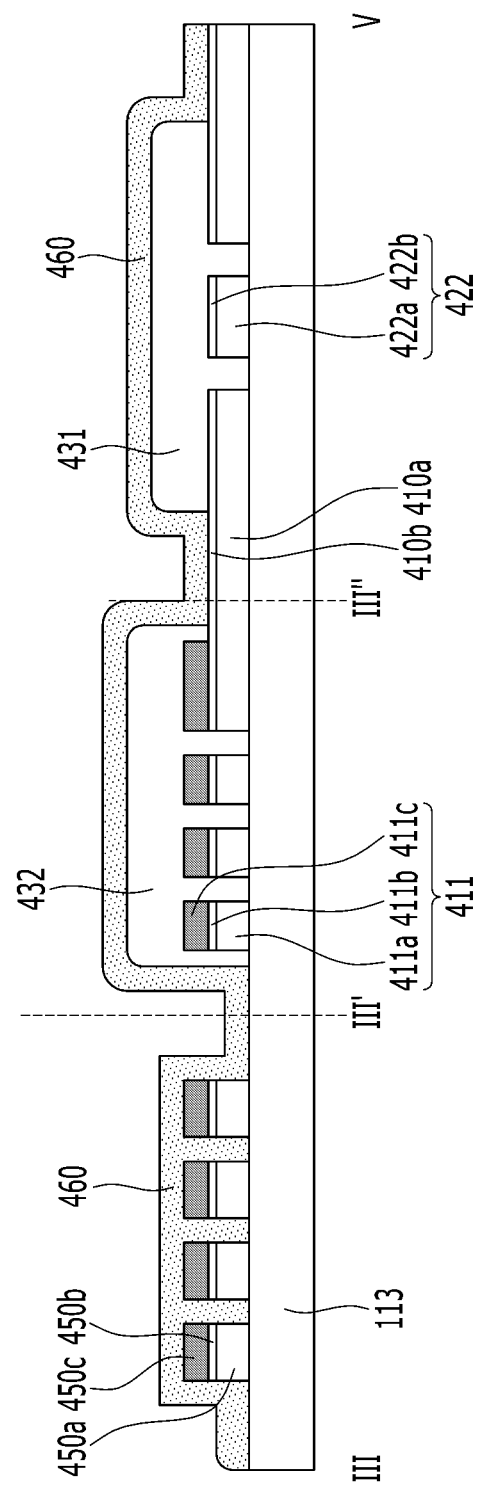

Referring to FIG. 9, a conductive polymer material such as polyacetylene, polyaniline (PANI), polythiophene (PT), polypyrrole, polyphenylene vinylene (PPV), poly(3,4-ethylenedioxythiopene) (PEDOT), etc., is coated on a substantially entire surface of the substrate 113 to form a polymer layer 460.

Figure 10:
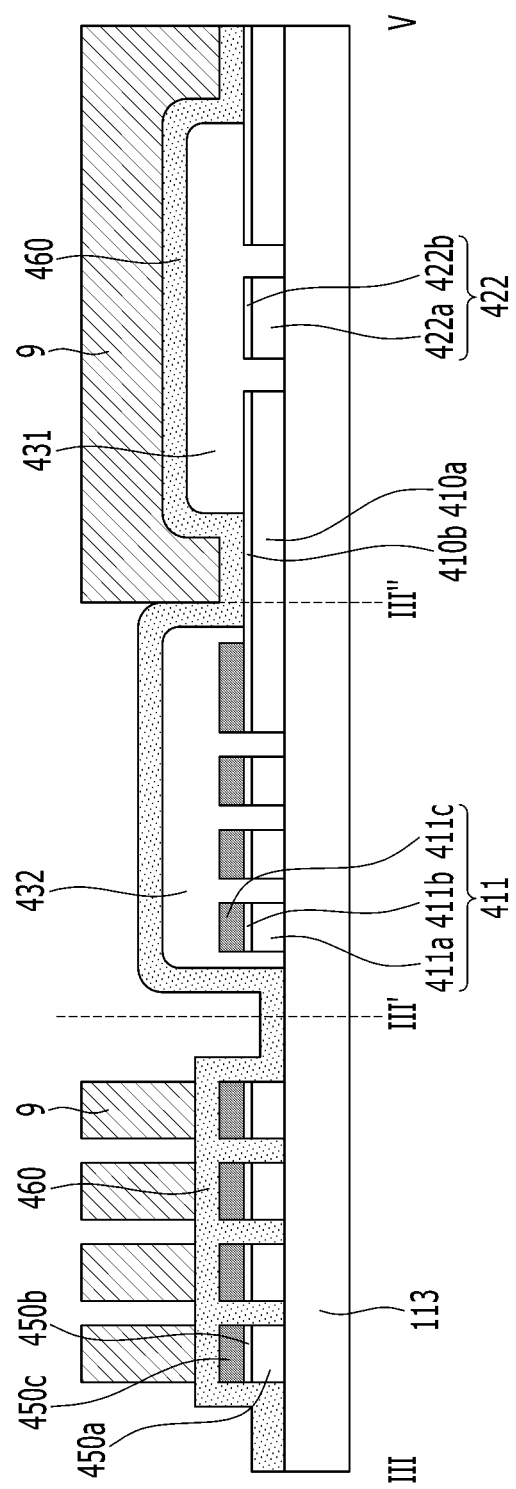

Referring to FIG. 10, a photoresist and the like are coated on the polymer layer 460 and the photoresist is then exposed to light and developed to form a mask pattern 9, such that a portion of the polymer layer 460 to be changed to a non-conductive region is exposed. Referring back to FIGS. 2 to 4, the polymer layer 460 that is not covered by the mask pattern 9 is oxidized by using an oxidant such as ceric ammonium nitrate (CAN), sodium hypochlorite (NaOClx), etc., to remove conductivity. As such, the polymer layer 460 includes the conductive region and the non-conductive region is formed.

The first connecting portion 412 for interconnecting the adjacent first touch electrodes 410, the fourth conductive layer 450d disposed on the third conductive layer 450c of the pad portion 450, and the fourth conductive layers 410d and 420d disposed on the second conductive layers 410b and 420b of the first and second touch electrodes 410 and 420 are formed, such that the pad portion 450, the first and second touch electrodes 410 and 420, and the first connecting portion 412 are formed. An oxidized part of the polymer layer 460 forms the non-conductive region, and may serve as an insulating layer for preventing corrosion or oxidation of the various conductive layers.

A touch sensor device including touch sensors according to an exemplary embodiment of the present invention will now be described with reference to FIG. 1 and FIG. 11.

Figure 11:
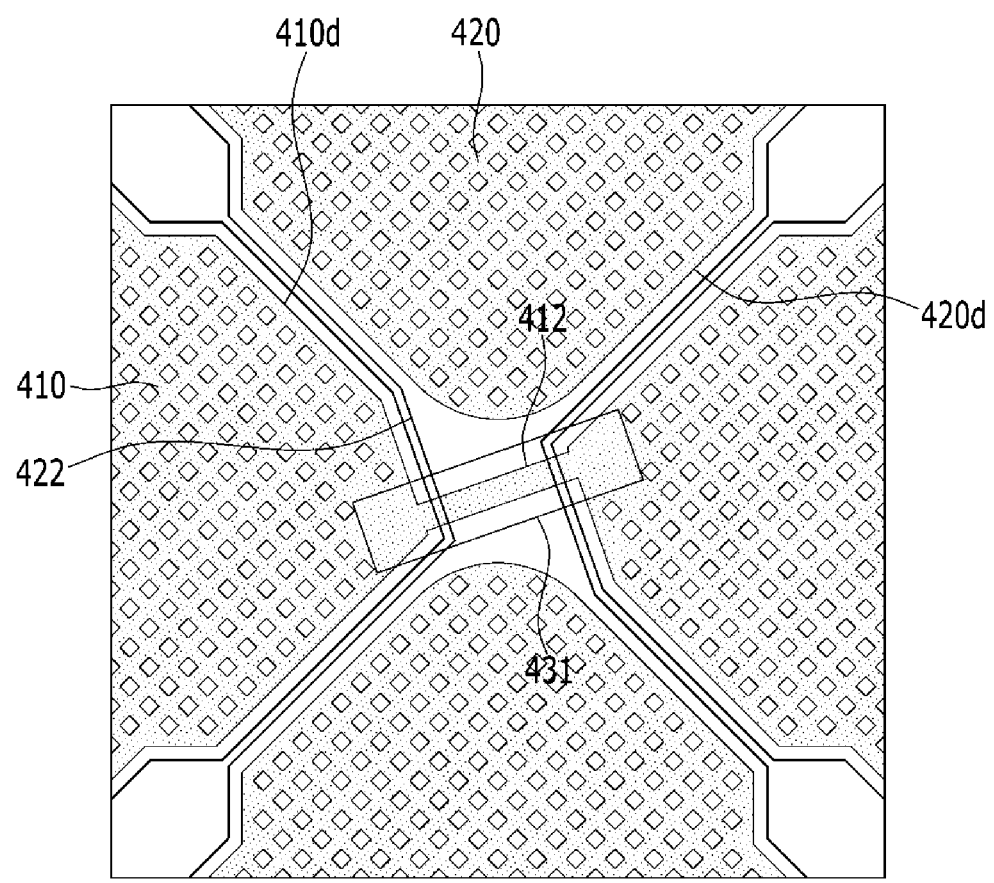
FIG. 11 is a partial enlarged view of the touch sensor device illustrated in FIG. 1.

Referring to FIGS. 1 and 11, the touch sensor device including the touch sensors according to the present exemplary embodiment is substantially the same as the touch sensor device according to the aforementioned exemplary embodiment, except for shapes of fourth conductive layers 410d and 420d of the first and second touch electrodes 410 and 420.

Referring to FIG. 11, fourth conductive layers 410d and 420d may have a mesh-like shape including openings. Accordingly, the first and second touch electrodes 410 and 420 may have improved transmittance, thereby improving transmittance of the touch sensing area TA.

A touch sensor device including touch sensors according to an exemplary embodiment of the present invention will now be described with reference to FIGS. 1 and 12 to 14.

Figure 12:
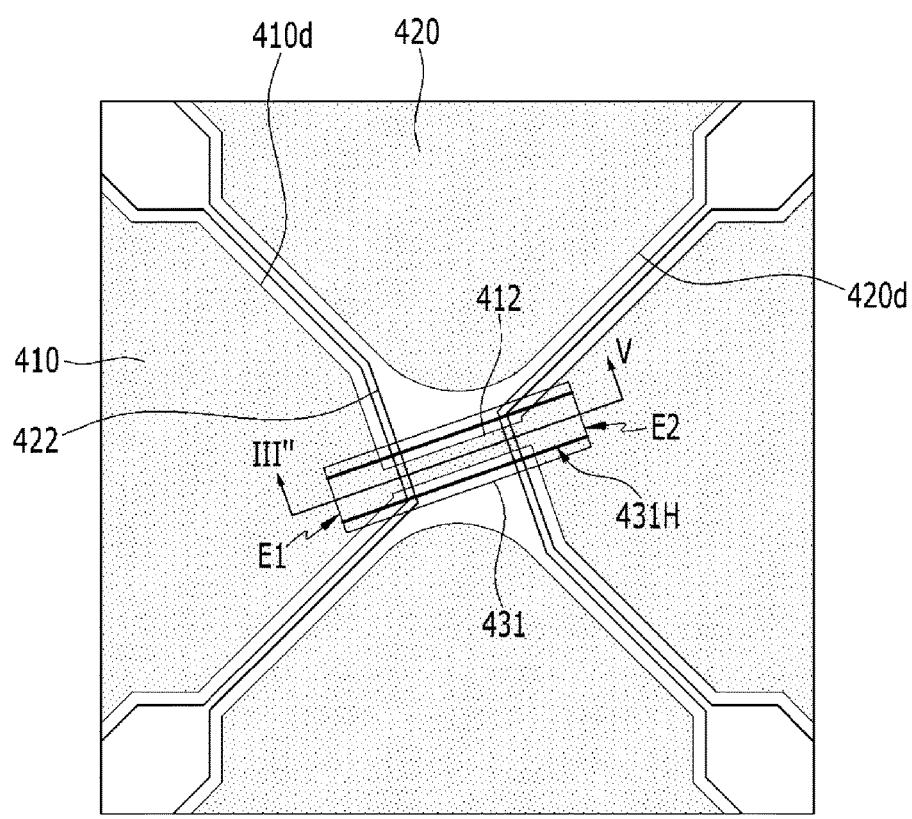
FIG. 12 is a partial enlarged view of the touch sensor device illustrated in FIG. 1.

Referring to FIGS. 1 and 12, the touch sensor device including the touch sensors according to the present exemplary embodiment is substantially the same as the touch sensors device according to aforementioned exemplary embodiments, except for a structure of the insulator 431.

The insulator 431 according to the present exemplary embodiment may include a recess portion 431H. The recess portion 431H is formed to face adjacent first touch electrode 410. The recess portion 431H is formed from one end E1 of the insulator 431 to the other end E2 opposite thereto.

A depth of the recess portion 431H may vary. The depth of the recess portion 431H may be increased as long as the first connecting portion 412 and the second connecting portion 422 are insulated from each other. The recess portion 431H of the insulator 431 may be formed by an exposure process using a mask having a slit or a halftone region while the insulators 431 and 432 are formed.

According to the present exemplary embodiment, since at least a part of the first connecting portion 412 is disposed on the recess portion 431H and extends along the recess portion 431H, the polymer layer 460 forming the first connecting portion 412 is formed thicker, to reduce resistance of the first connecting portion 412.

When a material for forming the polymer layer 460 is coated on the substrate 113, a larger amount of the polymer material may flow down as a height of a coated surface increases, and a thickness of the polymer layer 460 formed thereat may be relatively thinner. However, according to the present exemplary embodiment, since the first connecting portion 412 is disposed in the recess portion 431H to decrease the height at the forming position, a smaller amount of the polymer material flows down, thereby forming the first connecting portion 412 with a sufficient thickness D3.

Figure 13:
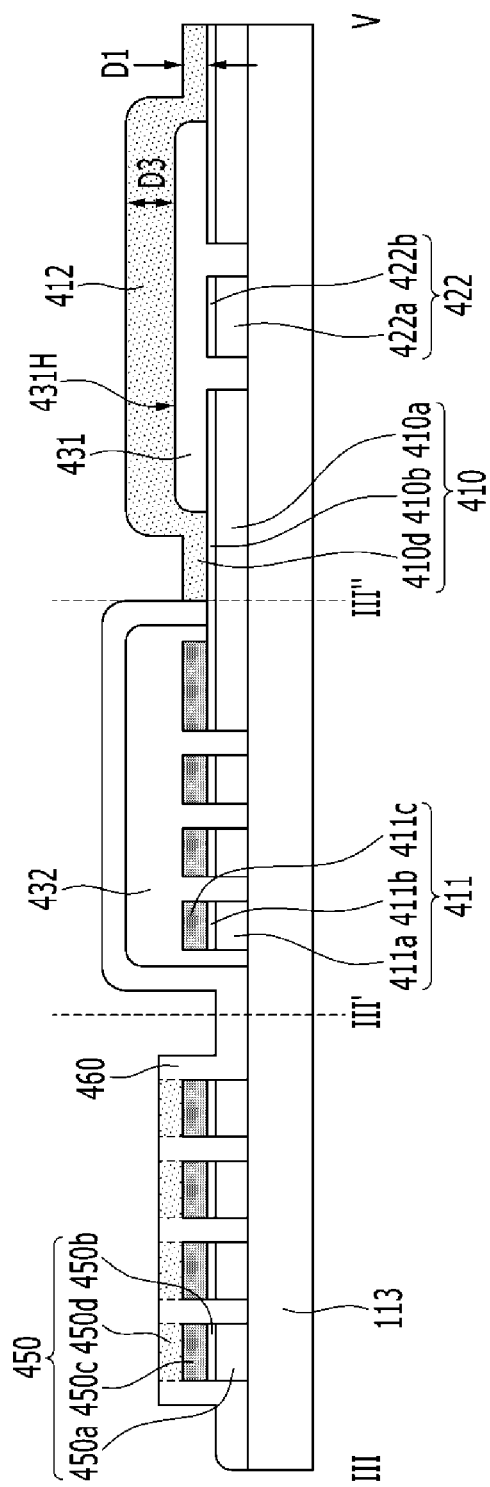
FIG. 13 is a cross-sectional view of the touch sensor device illustrated in FIGS. 1 and 12, taken along the line III-III'-III"-V.
Figure 14:
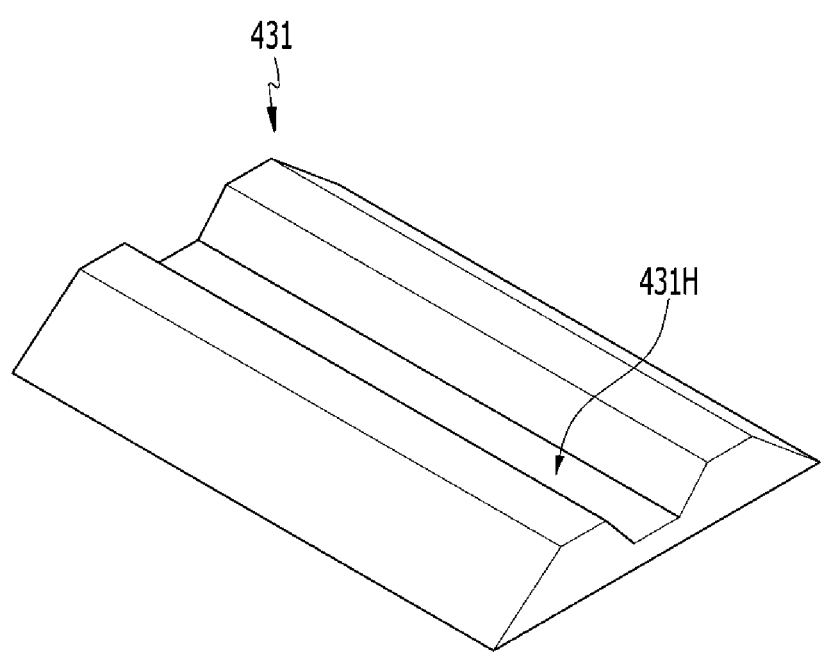
FIG. 14 is a perspective view of an insulator included in a touch sensor according to an exemplary embodiment of the present invention.

Referring to FIG. 13, the thickness D3 of the first connecting portion 412 disposed on the insulator 431 may be substantially the same as, greater than, or slightly smaller than a thickness D1 of the polymer layer 460 disposed on the first touch electrodes 410. More particularly, the thickness D3 of the first connecting portion 412 according to the present exemplary embodiment is greater than the thickness D2 of the first connecting portion 412 illustrated in FIG. 4. Accordingly, the resistance of the first connecting portion 412 may decrease to reduce signal delays of the sensing input signal and the sensing output signal and to prevent static electricity from being generated or concentrated.

Hereinafter, a touch sensor device including touch sensors according to an exemplary embodiment of the present invention will be described with reference to FIGS. 1, 15, and 16.

Figure 15:
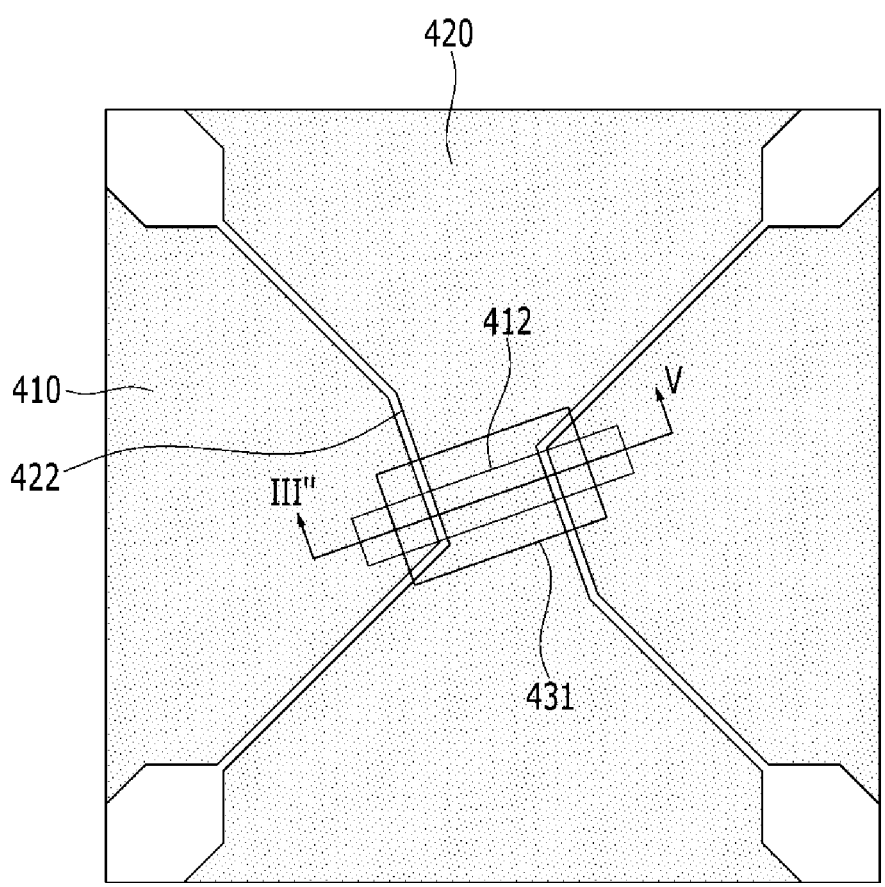
FIG. 15 is a partial enlarged view of the touch sensor device illustrated in FIG. 1.
Figure 16:
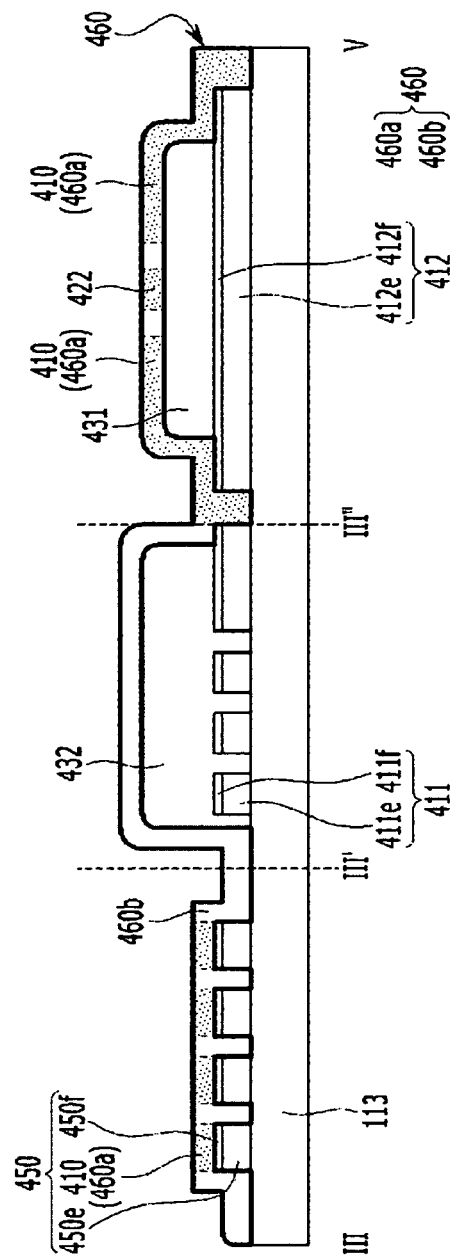
FIG. 16 is a cross-sectional view of the touch sensor device illustrated in FIGS. 1 and 15, taken along the line III-III'-III"-V.

Referring to FIGS. 1, 15, and 16, the touch sensor device including the touch sensors according to the present exemplary embodiment is substantially the same as the touch sensor devices according to the aforementioned exemplary embodiments, but positions of the first and second touch electrodes 410 and 420 and the first connecting portion 412 may be different.

First and second touch wires 411 and 421 including a pad portion 450, and a first connecting portion 412 are disposed on a substrate 113. At least one of the first and second touch wires 411 and 421 and the first connecting portion 412 may include a conductive layer that includes a single layer or multiple layers.

Referring to FIG. 16, the first connecting portion 412 include a first conductive layer 412e and a second conductive layer 412f formed thereon, the first and second touch wires 411 and 421 include a first conductive layer 411e and a second conductive layer 411f formed thereon, and the pad portion 450 may include a first conductive layer 450e and a second conductive layer 450f formed thereon.

The first conductive layers 412e, 411e, and 450e may include a low resistance material such as a metal such as molybdenum (Mo), silver (Ag), titanium (Ti), copper (Cu), palladium, aluminum (Al), molybdenum/aluminum/molybdenum (Mo/Al/Mo), etc., or a metal alloy such as silver/palladium/copper (APC). The second conductive layers 412f, 411f, and 450f may include a low resistance material that is different from those of the first conductive layers 412e, 411e, and 450e or a conductive oxide such as indium tin oxide (ITO), indium zinc oxide (IZO), etc.

Insulators 431 may be disposed on the first connecting portion 412 and an exposed portion of the substrate 113, and an insulator 432 may be disposed on the first and second touch wires 411 and 421 and the exposed portion of the substrate 113. The insulator 431 may be a separate island located on each of the first connecting portions 412, and covers a portion of the first connecting portions 412 while exposing the remaining first connection portions 412.

The insulator 432 may cover and protect the first and second touch wires 411 and 421, except for the pad portion, and may prevent a short-circuit between the first and second touch wires 411 and 421 or with other wires. The insulator 432 may not cover the pad portion 450. Alternatively, the insulator 432 may partially cover the pad portion 450.

A polymer layer 460 is disposed on a substantially entire surface that covers the first connecting portion 412, the insulators 431 and 432, and the second conductive layer 450f of the pad portion 450. The polymer layer 460 is seamlessly formed on the substrate 113, and is divided into a conductive region 460a and a non-conductive region 460b. More particularly, the conductive region 460a and the non-conductive region 460b are both disposed on the same layer, that is, on the polymer layer 460. A material for forming the polymer layer 460 is the same as the material descried above. In FIG. 16 various portions of the polymer layer 460 designated with different reference numerals are additionally labeled as the conductive region 460a or non-conductive region 460b in parenthesis.

The conductive region of the polymer layer 460 may include first and second touch electrodes 410 and 420, a second connecting portion 422 for interconnecting the adjacent second touch electrodes 420, and a third conductive layer 450g disposed on the second conductive layer 450f of the pad portion 450. The second connecting portion 422 is physically and electrically connected to two adjacent second touch electrodes 420 to electrically connect the adjacent second touch electrodes 420. The second connecting portion 422 is disposed on the insulator 431 to be separated from the first connecting portion 412.

Other various characteristics of planar structures and the like of the first and second touch electrodes 410 and 420, the first and second connecting portions 412 and 422, the first and second touch wires 411 and 421, and the pad portion 450 are the same as the aforementioned exemplary embodiments of the present invention, and accordingly, repeated description thereof will be omitted.

As described above, according to the present exemplary embodiment, the conductive layer above the first and second touch electrodes 410 and 420, the second connecting portion 422, and the first and second touch wires 411 and 421 are formed as the conductive region of the polymer layer 460, and thus a flexibility of the touch sensor device 400 may be improved and provide a good bending characteristic with a smaller bending radius.

In addition, since the polymer layer 460 is coated on the substantially entire surface of the substrate 113 and is not etched, corrosion or oxidation of the conductive layer and the like disposed in the uppermost part may be prevented, and the polymer layer 460 may serve as an insulating layer or overcoat.

Accordingly, an additional insulating layer may not be disposed on the conductive layers such as the first and second touch electrodes 410 and 420, the first and second touch wires 411 and 421, and the pad portion 450, so a manufacturing process of the touch sensor device 400 may be simplified.

The first connecting portion 412 for interconnecting the adjacent first touch electrodes 410 may be disposed on the same layer as the first touch electrodes 410 to be integrally formed with the first touch electrodes 410, and the second connecting portion 422 for interconnecting the second touch electrodes 420 may be disposed on a different layer from the second touch electrodes 420. In this case, the second connecting portion 422 and a structure connected thereto may have the same characteristics as the first connecting portion 412.

A manufacturing method of a touch sensor device according to an exemplary embodiment of the present invention will be described with reference to FIGS. 1 and 17 to 20.

Figure 17:
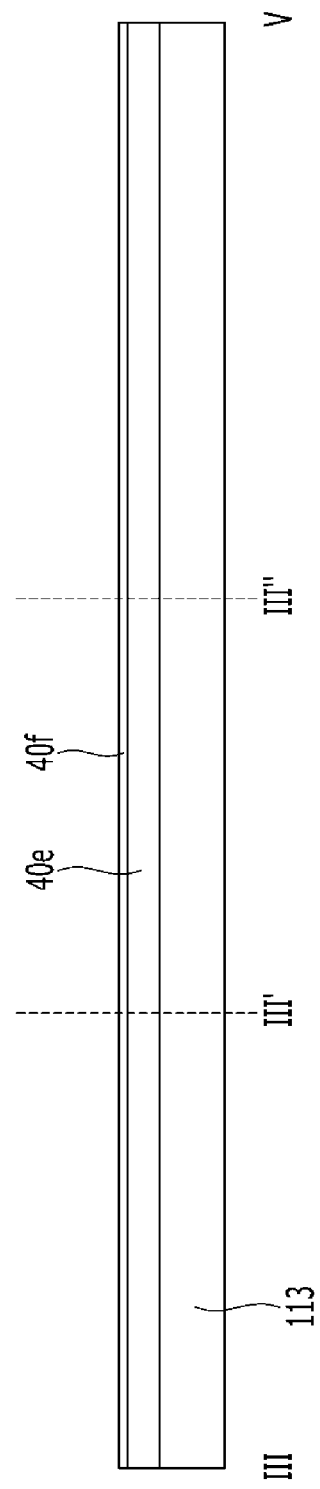
FIGS. 17, 18, 19, and 20 are cross-sectional views of an intermediate product manufactured by a manufacturing method of a touch sensor according to an exemplary embodiment of the present invention, taken along the line corresponding to the line III-III'-III"-V illustrated in FIGS. 1 and 15.

Referring to FIG. 17, a substrate 113 including glass or plastic is prepared, and a conductive low resistance material such as a metal such as molybdenum (Mo), silver (Ag), titanium (Ti), copper (Cu), palladium, aluminum (Al), molybdenum/aluminum/molybdenum (Mo/Al/Mo), etc., or a metal alloy such as silver/palladium/copper (APC) is laminated on the substrate 113 to form a first conductive layer 40e.

Next, on the first conductive layer 40e, a conductive oxide having a different low resistance material from the first conductive layer 40e or a conductive material such as indium tin oxide (ITO), indium zinc oxide (IZO), etc., is laminated to form a second conductive layer 40f.

Figure 18:
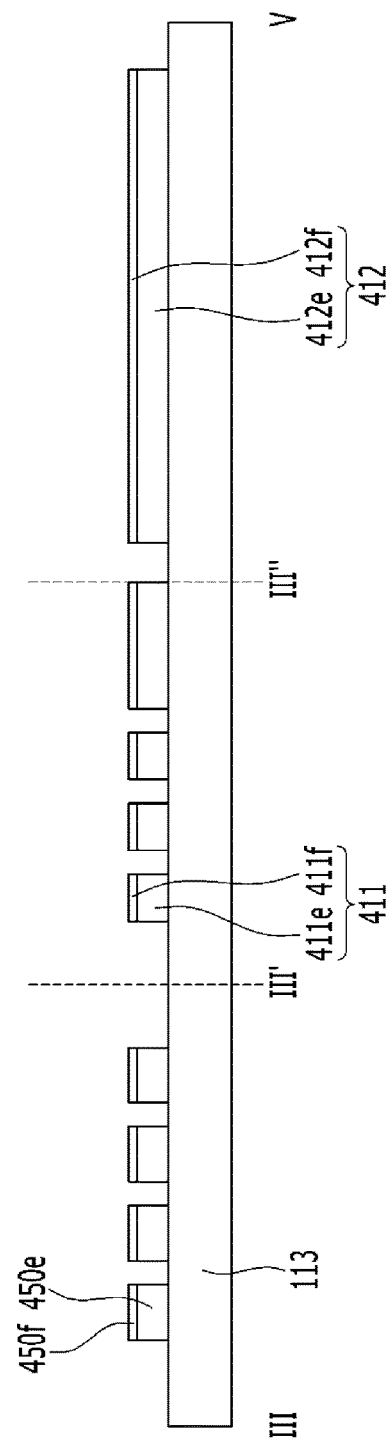

Referring to FIG. 18, the first and second conductive layers 40e and 40f are patterned using a photolithography process and the like to form first and second conductive layers 450e and 450f of a pad portion 450, first and second touch wires 411 and 421 including a first conductive layer 411e and a second conductive layer 411f, and a first connecting portion 412 including a first conductive layer 412e and a second conductive layer 412f.

Figure 19:
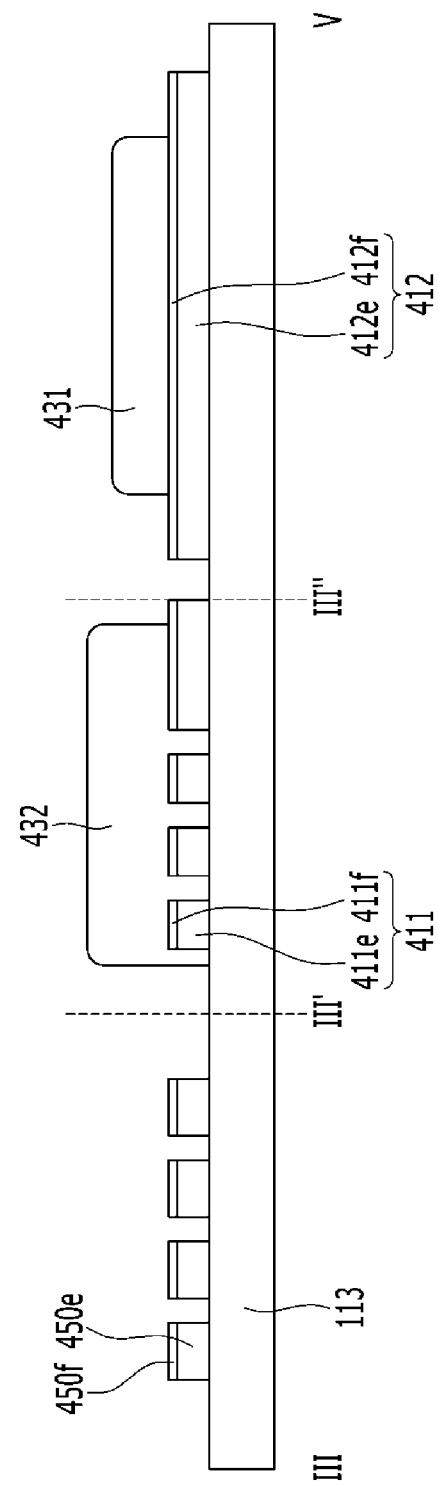

Referring to FIG. 19, an insulating material is laminated and patterned on a substantially entire surface of the substrate 113, such that an insulator 431 is formed to cover a portion of the first connecting portion 412 and expose the remaining portion of the first connecting portion 412, and such that an insulator 432 is formed on the first and second touch wires 411 to cover the first and second touch wires 411 and 421.

Figure 20:
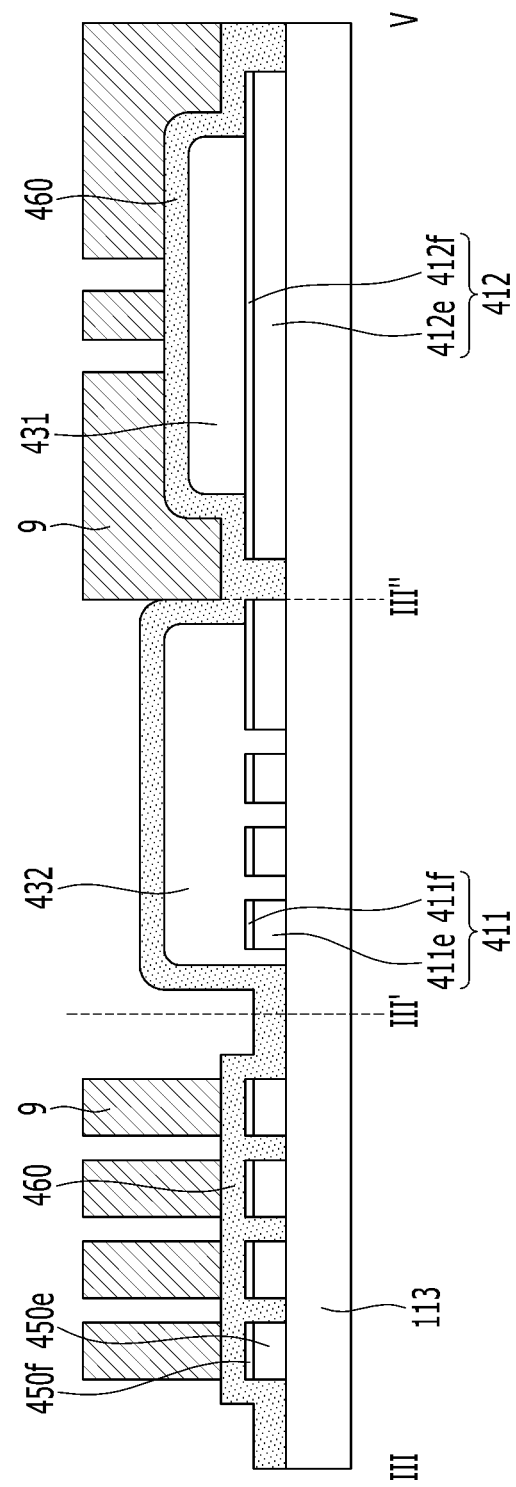

Referring to FIG. 20, a conductive polymer material such as polyacetylene, polyaniline (PANI), polythiophene (PT), polypyrrole, polyphenylene vinylene (PPV), poly(3,4-ethyl-enedioxythiopene) (PEDOT), etc., is coated on the substantially entire surface of the substrate 113 to form a polymer layer 460.

A photoresist and the like are then coated on the polymer layer 460, and the photoresist is exposed to light and developed to form a mask pattern 9, such that a portion of the polymer layer 460 to be changed to a non-conductive region is exposed.

Referring back to FIGS. 15 and 16, the polymer layer 460 that is not covered by the mask pattern 9 may be oxidized using an oxidant such as ceric ammonium nitrate (CAN), sodium hypo chlorite (NaOClx), etc., to remove conductivity, thereby forming the polymer layer 460 including the conductive region and the non-conductive region.

Accordingly, third conductive layers 450g of the first and second touch electrodes 410 and 420, a second connecting portion 422, and a pad portion 450 are formed. An oxidized part of the polymer layer 460 forms the non-conductive region to serve as an insulating layer for preventing corrosion or oxidation of the various conductive layers.

A touch sensor device including touch sensors according to an exemplary embodiment of the present invention will now be described with reference to FIGS. 1 and 21 to 23.

Figure 21:
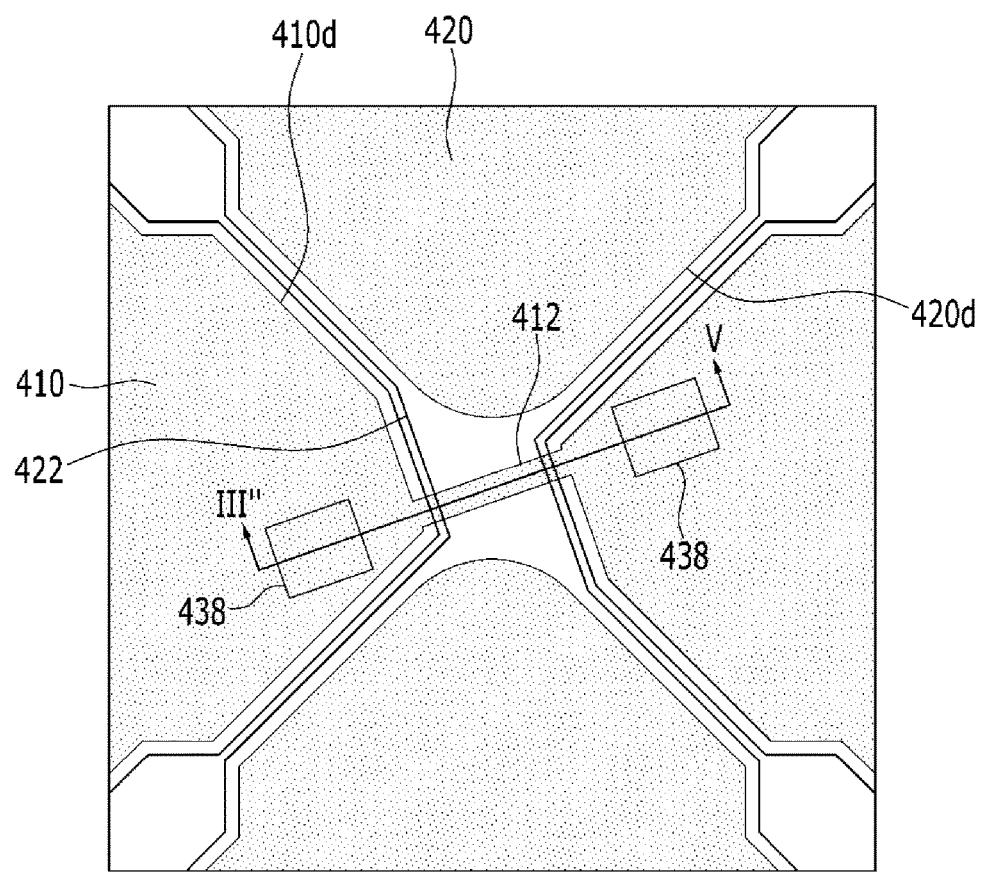
FIG. 21 is a partial enlarged view of the touch sensor device illustrated in FIG. 1.
Figure 22:
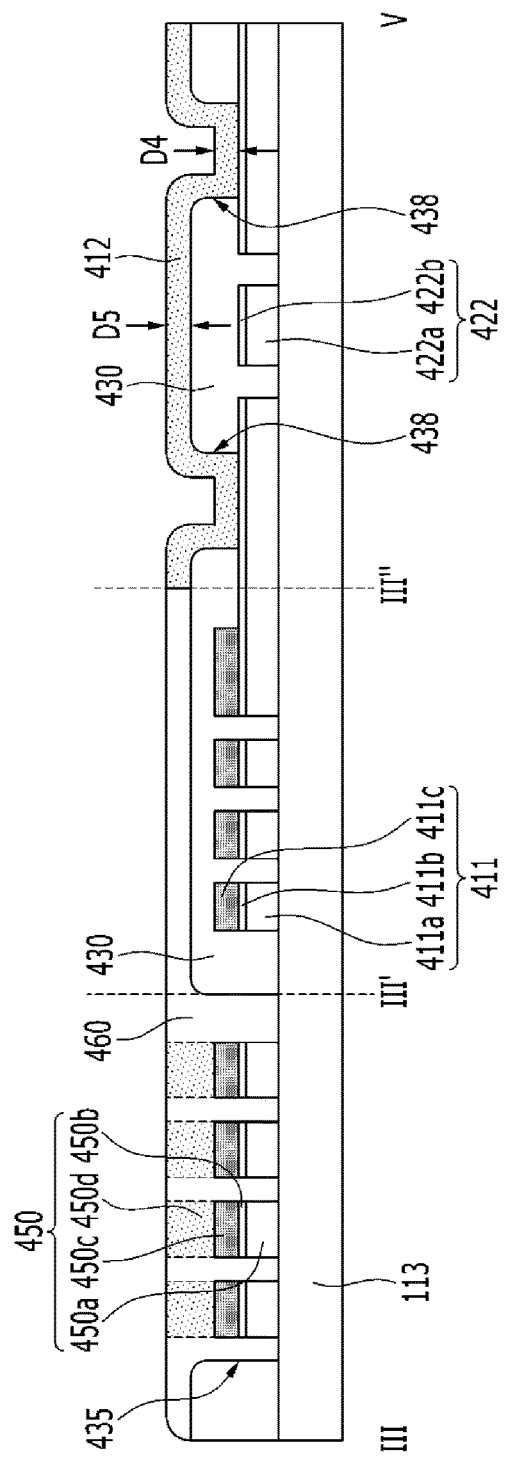
FIG. 22 is a cross-sectional view of the touch sensor device illustrated in FIGS. 1 and 21, taken along the line III-III'-III"-V.

Referring to FIGS. 21 and 22, the touch sensor device including the touch sensor according to the present exemplary embodiment is substantially the same as the touch sensor devices according to the aforementioned exemplary embodiments, but an insulating layer 430 may be formed on the first and second touch electrodes 410 and 420, the first and second touch wires 411 and 421, and the exposed substrate 113, instead of the island-like insulators 431.

The insulating layer 430 includes a contact hole 438 for partially exposing the first touch electrodes 410 and an opening 435 for exposing a pad portion 450 to connect the adjacent first touch electrodes 410 in the row direction.

According to the present exemplary embodiment, when the first and second touch electrodes 410 and 420 include fourth conductive layers 410d and 420d, the fourth conductive layers 410d and 420d may be separated from each other while interposing the third conductive layers 411a, 411b, and 411c and the insulating layer 430 therebetween.

The first connecting portion 412 is directly connected to the fourth conductive layers 410d and 420d, and may electrically connect the adjacent first touch electrodes 410 through the contact hole 438. Characteristics other than those described above may be substantially the same to those of the aforementioned exemplary embodiment, and specifically, to those of the exemplary embodiment of the present invention illustrated in FIGS. 1 to 4.

In the present exemplary embodiment, a thickness D5 of the first connecting portion 412 disposed on the insulating layer 430 may be the same as or different from the thickness D4 of the first connecting portion 412 or the polymer layer 460 that is disposed in the contact hole 438. As the polymer material for forming the polymer layer 460 has a lower viscosity, the thickness D5 of the first connecting portion 412 disposed on the insulating layer 430 may be smaller than the thickness D4 of the first connecting portion 412 or the polymer layer 460 that is disposed in the contact hole 438.

Figure 23:
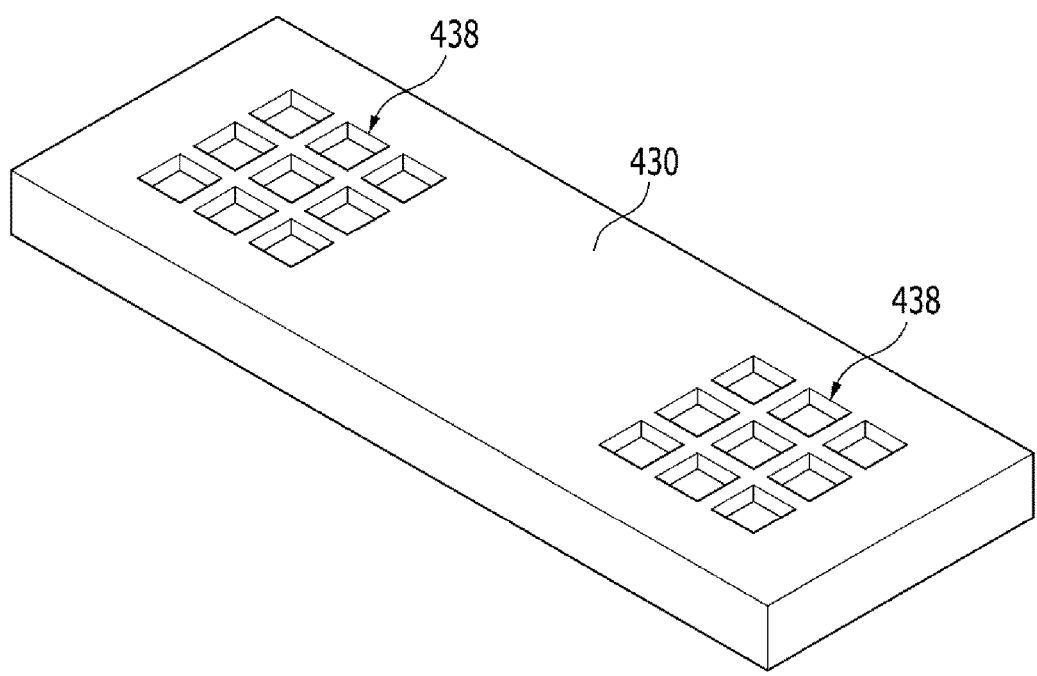
FIG. 23 is a perspective view of an insulator included in a touch sensor according to an exemplary embodiment of the present invention.

The contact hole 438 of the insulating layer 430 disposed on the single first touch electrode 410 may include of a single hole, as shown in FIG. 21, or may include holes, as shown in FIG. 23.

A touch sensor device including touch sensors according to an exemplary embodiment of the present invention will now be described with reference to FIGS. 21 to 23 and 24 to 28.

Figure 24:
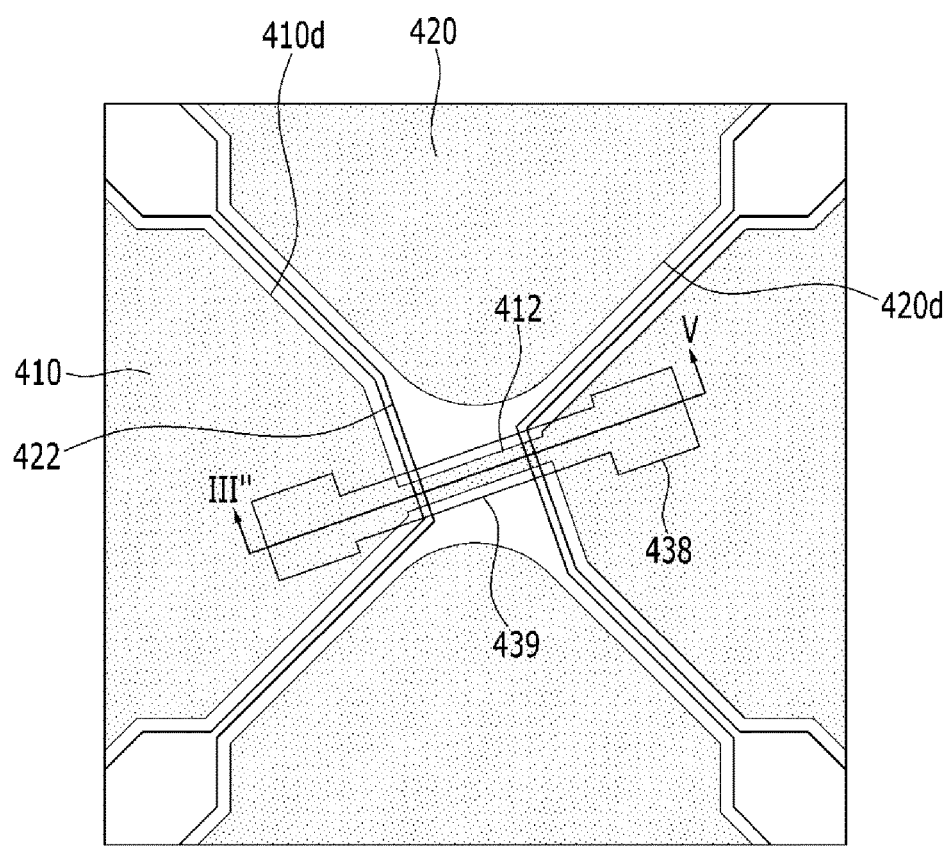
FIG. 24 is a partial enlarged view of the touch sensor device illustrated in FIG. 1.
Figure 25:
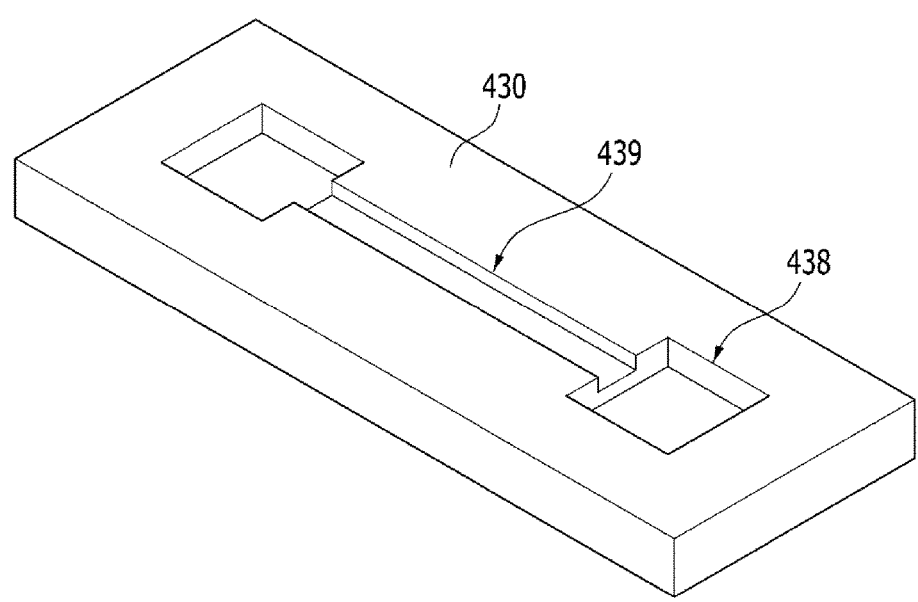
FIG. 25 is a perspective view of an insulator included in a touch sensor according to an exemplary embodiment of the present invention.
Figure 26:
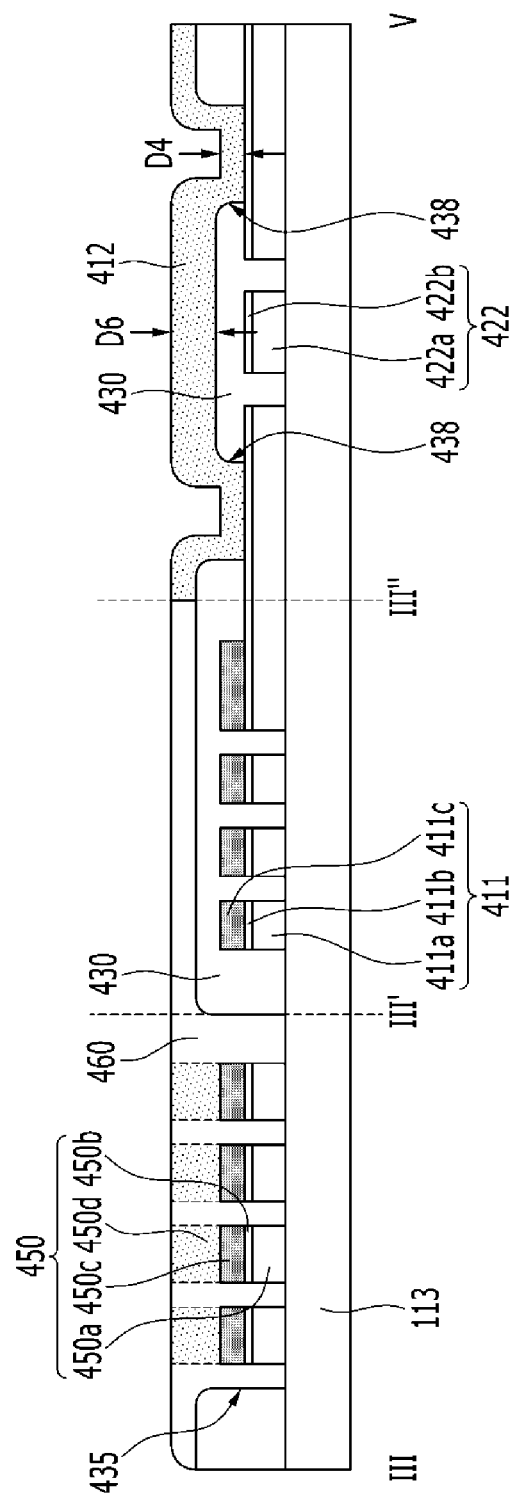
FIG. 26 is a cross-sectional view of the touch sensor device illustrated in FIGS. 1 and 24, taken along the line III-III'-III"-V.

Referring to FIGS. 24 to 26, the touch sensor device including the touch sensors according to the present exemplary embodiment is substantially the same as the aforementioned exemplary embodiment illustrated in FIGS. 21 to 23, except for a structure of the insulating layer 430.

The insulating layer 430 according to the present exemplary embodiment may further include a recess portion 439 for connecting the two contact holes 438 for exposing the two adjacent first touch electrodes 410. Depth of the recess portion 439 may vary, and the depth may be increased as long as the first connecting portion 412 and the second connecting portion 422 are insulated from each other. In addition, the depth of the recess portion 439 according to a position may be constant, or may be changed.

According to the present exemplary embodiment, since at least a portion of the first connecting portion 412 is disposed on the recess portion 439 and extends along the recess portion 439, a thickness of the polymer layer 460 forming the first connecting portion 412 is formed thicker to reduce resistance of the first connecting portion 412.

When a material for forming the polymer layer 460 is coated on the substrate 113, a larger amount of the polymer material may flow down as a height of a coated surface increases, and a thickness of the polymer layer 460 formed thereat may be relatively thinner. However, according to the present exemplary embodiment, since the first connecting portion 412 is disposed in the recess portion 439 to decrease the height at the forming position, a smaller amount of the polymer material flows down, thereby forming the first connecting portion 412 with a sufficient thickness D6.

Referring to FIG. 26, the thickness D6 of the first connecting portion 412 may be substantially the same as, greater than, or slightly smaller than the thickness D4 of the polymer layer 460 that is disposed on the contact hole 438. More particularly, the thickness D6 of the first connecting portion 412 according to the present exemplary embodiment is greater than the thickness D5 of the first connecting portion 412 in the aforementioned exemplary embodiment illustrated in FIG. 22.

Accordingly, the resistance of the first connecting portion 412 may decrease to reduce signal delays of the sensing input signal, the sensing output signal, and the like and to prevent static electricity from being generated or concentrated.

Figure 27:
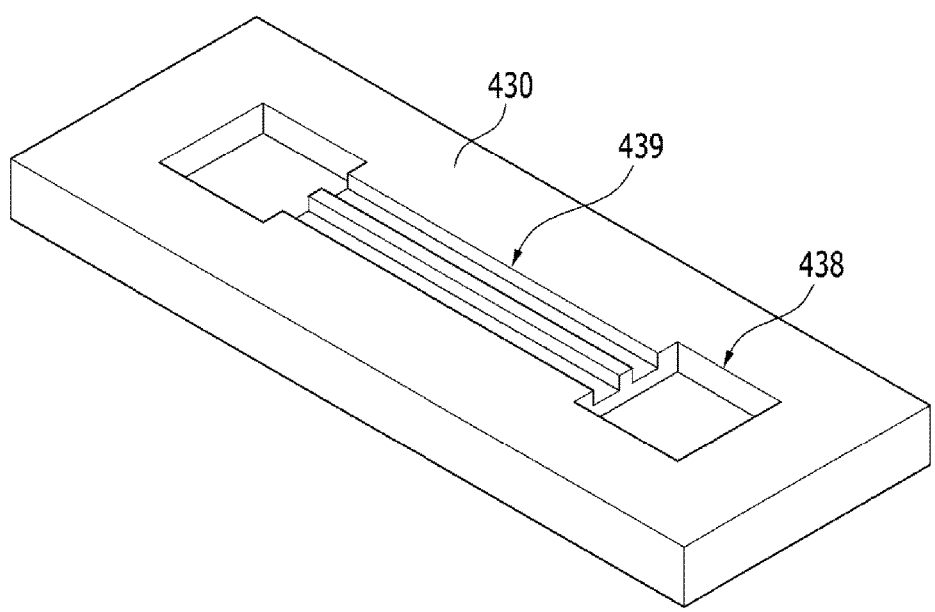
FIGS. 27 and 28 are perspective views of insulators included in touch sensors according to exemplary embodiments of the present invention, respectively.
Figure 28:
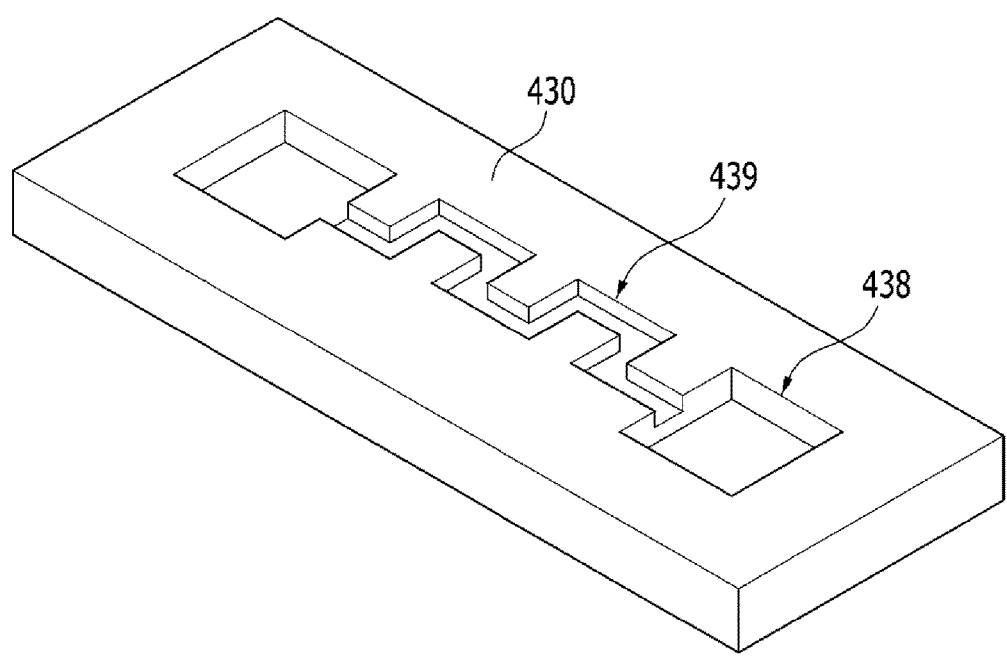

The single recess portion 439 for connecting the two contact holes 438 may be provided. Alternatively, recess portions 439 may be provided, as shown in FIG. 27. The recess portion 439 for connecting the two contact holes 438 may be linearly formed, or alternatively, may include at least one bending point, as shown in FIG. 28. For example, the recess portion 439 may have a zigzag shape.

Hereinafter, a touch sensor device including touch sensors according to an exemplary embodiment of the present invention will be described with reference to FIG. 29.

Figure 29:
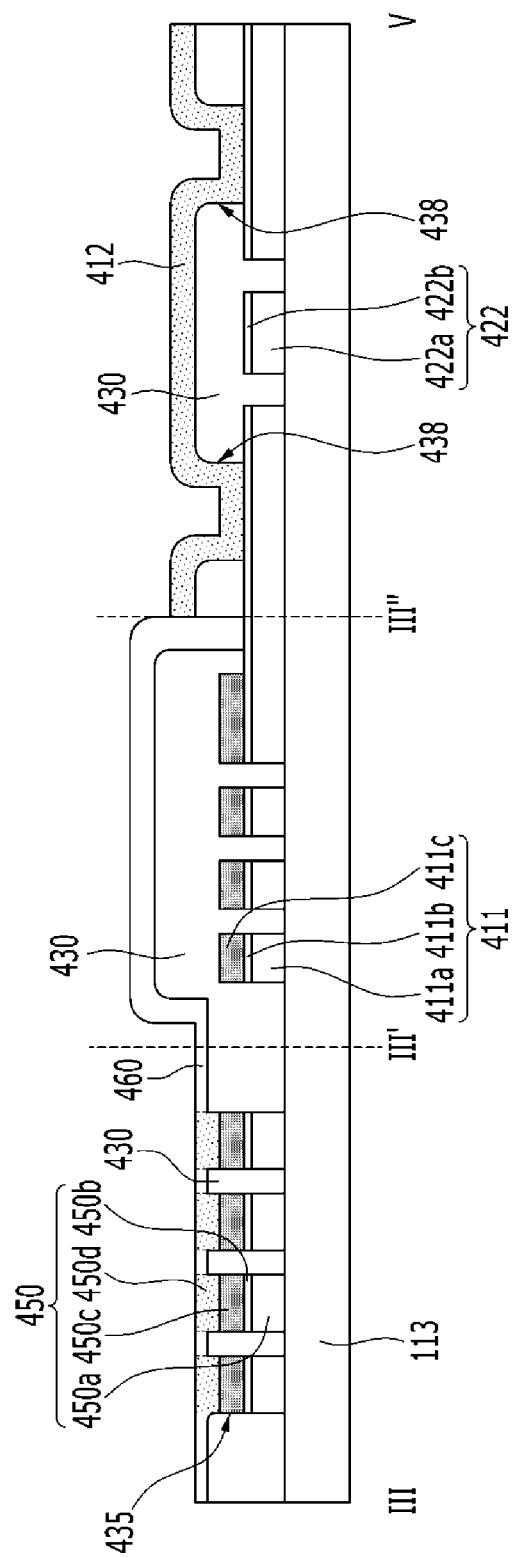
FIG. 29 is a cross-sectional view of the touch sensor device illustrated in FIGS. 1 and 21, taken along the III-III'-III"-V.

Referring to FIG. 29, the touch sensor device including the touch sensors according to an exemplary embodiment of the present invention is substantially the same as the touch sensor devices according to the aforementioned exemplary embodiments, more particularly, the touch sensor device according to the exemplary embodiment illustrated in FIGS. 21 to 28, except for a structure of the opening 435 for exposing the pad portion 450.

The opening 435 for exposing the pad portion 450 may not expose all the pad portions 450, but may expose each of the pad portions 450 of the first and second touch wires 411 and 421.

In this case, the thickness of the fourth conductive layer 450d of the pad portion 450 may further increase to reduce the resistance of the pad portion 450. In addition, a short-circuit risk between the adjacent pad portions 450 may be reduced.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch sensor device, comprising:
   first touch electrodes and second touch electrodes disposed on a substrate; and
   a polymer layer comprising a polymer material formed on a substantially entire area of the substrate, the polymer layer disposed in a different layer from a layer where the first and second touch electrodes are disposed over the substrate,
   wherein:
   the polymer layer comprises conductive and non-conductive regions;
   the conductive region of the polymer layer comprises a first connecting portion, the first connecting portion comprises the polymer material and connects adjacent ones of the first touch electrodes to each other;
   the first touch electrode comprises at least two conductive layers and a first portion of the conductive region of the polymer layer, the at least two conductive layers of the first touch electrode disposed between the substrate and the first portion; and
   the second touch electrode comprises at least two conductive layers and a second portion of the conductive region of the polymer layer, the at least two conductive layers of the second touch electrode disposed between the substrate and the second portion.

2. The touch sensor device of claim 1, further comprising a second connecting portion connecting adjacent second touch electrodes,
   wherein the first and second connecting portions are insulated from and cross each other.

3. The touch sensor device of claim 2, further comprising a first insulator disposed between the first connecting portion and the second connecting portion.

4. The touch sensor device of claim 3, wherein:
the first insulator comprises a recess portion extending from a first end to a second end of the first insulator; and
a portion of the first connecting portion is disposed on the recess portion.

5. The touch sensor device of claim 3, wherein
the first touch electrodes comprise a first conductive layer;
the conductive region of the polymer layer comprises:
a first conductive portion that is disposed on the first touch electrode and directly connected to the first connecting portion; and
the second touch electrodes comprise a second conductive portion that is disposed on the second touch electrode and insulated from the first connecting portion.

6. The touch sensor device of claim 5, wherein the first conductive portion and the second conductive portion have a mesh structure.

7. The touch sensor device of claim 5, further comprising:
a first touch wire connected to the first touch electrodes; and
a second touch wire connected to the second touch electrodes,
wherein:
a pad portion of the first and second touch wires comprises conductive layers; and
the conductive region of the polymer layer comprises a portion disposed on and connected to one of the conductive layers of the pad portion.

8. The touch sensor device of claim 7, further comprising a second insulator covering the first and second touch wires except for the pad portion.

9. The touch sensor device of claim 2, further comprising an insulating layer disposed between the first connecting portion and the second connecting portion and on an entire surface of the substrate,
wherein:
the insulating layer comprises first and second contact holes respectively exposing adjacent first touch electrodes; and
the first connecting portion connects the adjacent first touch electrodes through the first and second contact holes.

10. The touch sensor device of claim 9, wherein:
the insulating layer comprises at least one recess portion connecting the first contact hole and the second contact hole; and
a portion of the first connecting portion is disposed on the recess portion.

11. A touch sensor device, comprising:
touch wires and first connecting portions disposed on a substrate; and
a polymer layer comprising a polymer material formed on a substantially entire area of the substrate, the polymer layer disposed in a different layer from a layer where the touch wires and the first connecting portions are disposed over the substrate,
wherein:
the polymer layer comprises conductive and non-conductive regions;
the conductive region of the polymer layer comprises first touch electrodes and second touch electrodes;
the first touch electrode of the polymer layer contacts the first connecting portion, and the first connecting portion connects adjacent ones of the first touch electrodes to each other;

the first touch electrode comprises at least two conductive layers and a first portion of the conductive region of the polymer layer, the at least two conductive layers of the first touch electrode disposed between the substrate and the first portion; and
the second touch electrode comprises at least two conductive layers and a second portion of the conductive region of the polymer layer, the at least two conductive layers of the second touch electrode disposed between the substrate and the second portion.

12. The touch sensor device of claim 11, further comprising:
a second connecting portion connecting adjacent second touch electrodes; and
a first insulator disposed between the first connecting portion and the second connecting portion.

13. The touch sensor device of claim 12, wherein:
a pad portion of the touch wires comprises conductive layers; and
the conductive region of the polymer layer comprises a portion disposed on and connected to one of the conductive layers of the pad portion.

14. A manufacturing method of a touch sensor device, the method comprising:
forming first touch electrodes, second touch electrodes, and touch wires connected to the first and second touch electrodes on a substrate;
forming a polymer layer by coating a polymer material on a substantially entire surface of the substrate;
forming a mask pattern on the polymer layer;
forming a non-conductive region by oxidizing the polymer layer exposed by the mask pattern; and
forming a conductive region covered by the mask pattern,
wherein:
the first touch electrode comprises at least two conductive layers and a first portion of the conductive region of the polymer layer, the at least two conductive layers of the first touch electrode disposed between the substrate and the first portion; and
the second touch electrode comprises at least two conductive layers and a second portion of the conductive region of the polymer layer, the at least two conductive layers of the second touch electrode disposed between the substrate and the second portion.

15. The manufacturing method of claim 14, wherein the conductive region of the polymer layer comprises a first connecting portion connecting adjacent first touch electrodes.

16. The manufacturing method of claim 15, wherein forming the first and second touch electrodes further comprises:
forming a second connecting portion connecting adjacent second touch electrodes; and
forming a first insulator covering the second connecting portion after forming of the first and second touch electrodes.

17. The manufacturing method of claim 16, wherein the first insulator comprises a recess portion extending from one end to the other end of the first insulator.

18. The manufacturing method of claim 15, wherein:
forming the first and second touch electrodes further comprises:
forming a second connecting portion connecting adjacent second touch electrodes; and
forming an insulating layer on an entire surface of the substrate after forming the first and second touch electrodes;

the insulating layer comprises first and second contact holes exposing the adjacent first touch electrodes, respectively; and the first connecting portion connects the adjacent first touch electrodes through the first and second contact holes.

19. The manufacturing method of claim 14, wherein the conductive region of the polymer layer comprises one of conductive layers of a pad portion of the touch wire.

20. A manufacturing method of a touch sensor device, the method comprising:

forming touch wires, first touch electrodes, second touch electrodes, and first connecting portions on a substrate;

forming a polymer layer by coating a polymer material on a substantially entire surface of the substrate;

forming a mask pattern on the polymer layer;

forming a non-conductive region by oxidizing the polymer layer exposed by the mask pattern; and forming a conductive region covered by the mask pattern, wherein:

the first touch electrode comprises at least two conductive layers and a first portion of the conductive region of the polymer layer, the at least two conductive layers of the first touch electrode disposed between the substrate and the first portion; and the second touch electrode comprises at least two conductive layers and a second portion of the conductive region of the polymer layer, the at least two conductive layers of the second touch electrode disposed between the substrate and the second portion.

21. The manufacturing method of claim 20, wherein the conductive region of the polymer layer comprises the first touch electrodes, the second touch electrodes, and a second connecting portion connecting adjacent second touch electrodes.

22. The manufacturing method of claim 21, further comprising forming a first insulator covering the first connecting portion after forming the touch wires and the first connecting portions.

23. The manufacturing method of claim 20, wherein the conductive region of the polymer layer comprises one of conductive layers of a pad portion of the touch wire.

* * * * *